(12) United States Patent
De Lutiis et al.

(10) Patent No.: US 7,954,141 B2
(45) Date of Patent: May 31, 2011

(54) METHOD AND SYSTEM FOR TRANSPARENTLY AUTHENTICATING A MOBILE USER TO ACCESS WEB SERVICES

(75) Inventors: Paolo De Lutiis, Turin (IT); Gaetano Di Caprio, Turin (IT); Corrado Moiso, Turin (IT)

(73) Assignee: Telecom Italia S.p.A., Milano (IT)

( * ) Notice: Subject to any disclaimer, the term of this patent is extended or adjusted under 35 U.S.C. 154(b) by 1069 days.

(21) Appl. No.: 11/666,125

(22) PCT Filed: Sep. 30, 2005

(86) PCT No.: PCT/EP2005/010590
§ 371 (c)(1),
(2), (4) Date: Apr. 24, 2007

(87) PCT Pub. No.: WO2006/045402
PCT Pub. Date: May 4, 2006

(65) Prior Publication Data
US 2008/0127320 A1 May 29, 2008

(30) Foreign Application Priority Data
Oct. 26, 2004 (WO) ............... PCT/EP2004/012052

(51) Int. Cl.
*G06F 7/04* (2006.01)
*G06F 15/16* (2006.01)
*G06F 17/30* (2006.01)
*H04L 29/06* (2006.01)
(52) U.S. Cl. ............ 726/9; 706/2; 706/3; 706/4; 706/10
(58) Field of Classification Search .................. 713/168; 380/247–250; 455/411; 379/142.05; 726/2–4, 726/9–10
See application file for complete search history.

(56) References Cited

U.S. PATENT DOCUMENTS

| | | | |
|---|---|---|---|
| 7,107,620 B2 * | 9/2006 | Haverinen et al. | 726/29 |
| 7,200,383 B2 * | 4/2007 | Eronen | 455/411 |
| 7,281,137 B1 * | 10/2007 | Vitikainen | 713/189 |
| 7,444,513 B2 * | 10/2008 | Nyman et al. | 713/169 |

(Continued)

FOREIGN PATENT DOCUMENTS
WO    WO 01/03402 A1    1/2001
(Continued)

OTHER PUBLICATIONS

Tschofenig, et al., "Using SAML for SIP, draft-tschofenig-sip-saml-00", http://www.ietf.org/internet-drafts/draft-tschofenig-sip-saml-00.txt, pp. 1-29, (2004).

(Continued)

*Primary Examiner* — Matthew B Smithers
*Assistant Examiner* — Jing Sims
(74) *Attorney, Agent, or Firm* — Finnegan, Henderson, Farabow, Garrett & Dunner, L.L.P.

(57) ABSTRACT

A system and method for authenticating a subscriber of a first network to access application services through a second network, wherein the second network is a packet data network. The system includes a mobile station connected to a cellular network and apt to generate access-request messages enclosed in data packets, the access-request messages being expressed with a syntax that complies with an application-level protocol; an allocation server apt to allocate an address in the second network to the subscriber and to provide a mapping between the subscriber's address and a first subscriber's identifier; a gateway which interfaces the first network to the second network and assigns the subscriber's address to the mobile station; a service token injector linked with the gateway and apt to intercept the data packets generated from the endpoint station and directed to the second network through the gateway and to capture in the data packet at least the subscriber's address, and an identity authority logical entity linked with the service token injector.

38 Claims, 11 Drawing Sheets

U.S. PATENT DOCUMENTS

| | | | |
|---|---|---|---|
| 2003/0005333 A1* | 1/2003 | Noguchi et al. | 713/201 |
| 2003/0163733 A1 | 8/2003 | Barriga-Caceres et al. | |
| 2004/0064442 A1 | 4/2004 | Popovitch | |
| 2004/0128560 A1* | 7/2004 | Challener et al. | 713/202 |
| 2004/0132429 A1 | 7/2004 | Gill et al. | |
| 2005/0078705 A1* | 4/2005 | Ito | 370/466 |
| 2006/0264201 A1* | 11/2006 | Zhang | 455/411 |
| 2007/0127495 A1* | 6/2007 | de Gregorio et al. | 370/395.52 |

FOREIGN PATENT DOCUMENTS

| | | |
|---|---|---|
| WO | WO 01/17310 A1 | 3/2001 |
| WO | WO 01/67716 A1 | 9/2001 |
| WO | WO 01/72009 A2 | 9/2001 |
| WO | WO 2004/064442 A1 | 7/2004 |

OTHER PUBLICATIONS

Canales, et al., "Liberty ID-WSF—a Web Services Framework", Liberty Alliance Project, http://www.projectliberty.org/resources/whitepapers, pp. 1-15, (2004).

Halasz, "IEEE 802.11i and Wireless Security", http://www.embedded.com/showArticle.jhtml?articleID=34400002, pp. 1-9, (2004).

* cited by examiner

Table

| Identity | Service Provider | Pseudonym |
|---|---|---|
| IMSI-A | SP-1 | PS-A1 |
| IMSI-A | SP-2 | PS-A2 |
| IMSI-A | SP-3 | PS-A3 |
| IMSI-B | SP-1 | PS-B1 |
| IMSI-B | SP-4 | PS-B4 |
| IMSI-C | SP-5 | PS-C5 |
| ⋮ | ⋮ | ⋮ |
| ⋮ | ⋮ | ⋮ |

FIG. 2

Table

| Identity | Service Provider | Pseudonym |
|---|---|---|
| LOGIN-A | SP-1 | PS-A1 |
| LOGIN-A | SP-2 | PS-A2 |
| LOGIN-A | SP-3 | PS-A3 |
| LOGIN-B | SP-1 | PS-B1 |
| LOGIN-B | SP-4 | PS-B4 |
| LOGIN-C | SP-5 | PS-C5 |
| ⋮ | ⋮ | ⋮ |
| ⋮ | ⋮ | ⋮ |

FIG. 8

METHOD AND SYSTEM FOR TRANSPARENTLY AUTHENTICATING A MOBILE USER TO ACCESS WEB SERVICES

CROSS REFERENCE TO RELATED APPLICATIONS

This application is a national phase application based on PCT/EP2005/010590, filed Sep. 30, 2005, and claims the priority under 35 U.S.C. 365(b) of international application number PCT/EP2004/012052, filed Oct. 26, 2004, the content of both of which is incorporated herein by reference.

FIELD OF THE INVENTION

The present invention relates to an authentication method and a system for identifying a subscriber of a first network to a packet data network, e.g., the Internet. In particular, the invention was developed for its use in authentication of subscribers of a mobile network to a packet data network by utilizing a subscriber's identification associated to the subscriber in the mobile network.

BACKGROUND

The number of users who access private or public Packet Data Networks (PDNs), e.g., Internet, from remote locations is growing enormously. In addition, the vision of multimedia services that are available to people regardless of their location has driven the development of cellular networks using a packet-switched connection, e.g., using the Internet Protocol (IP), meaning that a virtual connection is always available to any other end point in the network. Standards of packet-based wireless communication services include General Packet Radio Service (GPRS), Enhanced Data Rate for GSM Evolution (EDGE), and Universal Mobile Telecommunications Service (UMTS).

Recently, due to the reduction of costs and to the ever-increasing connection capabilities more and more high-speed data communication systems are being installed at customer premises. These data communication systems work, for example, on the same twisted-pair copper lines of the Public Switched Telephone Network (PSTN) to connect to the Internet. Internet connections over ordinary telephone lines generally take place through Digital Subscriber Line (DSL) access technology, although other high-speed modems are also used. DSL uses a specialized modem to enable high-speed data transfer between the subscriber's home and the nearest telephone central office over the standard copper wiring used to bring phone service into the home. There are a number of DSL communication schemes (generally referred to as xDSL technologies), but one of the most common forms commercially available is ADSL (Asymmetric DSL), in which the downstream (i.e. to the subscriber) data rates are several times faster than the upstream (i.e. from the subscriber) data rates.

Another access technology that has gained interest in recent years is the fibre-to-the-home (FTTH), a high-speed broadband access system in which an optical fiber runs from the telephone switch to the subscriber's premises.

In short-range wireless Internet connections, a computer or handset (e.g., PDA) with built-in wireless capability uses radio technologies to send and receive data anywhere within the range of an access point or a gateway, which acts as broadcast-and-receive base station and as interface between the wireless network and a wired network. For example, radio technologies between the wireless device and the access point can be based on the IEEE 802.11 standard (Wi-Fi® specification) or on IEEE 802.16 standard (WiMAX specification).

Broadband access technologies have allowed service providers to expand their content and service offerings to both business and home users. For example, a user may subscribe to multiple services or applications, such as voice service, Internet access service, a video service, a gaming service, etc. from one or more service providers. These services and/or applications available through a private or public PDN (e.g., Internet) may be delivered over a single network connection, such as a DSL line.

On the other hand, a constantly growing number of services available on the PDNs grant access only to authorised users, such in the case of pay-per-session services, services that require subscription, or of services customized according to the profile of their users. Some conventional authentication procedures use passwords, e.g., strings of characters recognised by automatic means, which permit a user access to protected files, or input/output devices.

The applicant has made the following considerations. First, password-based authentication systems are naturally not transparent to the user, who has to enter his password when acceding a service. This may become particularly undesirable when a user wants to access a plurality of services during a session. Second, although being technologically simple to implement, passwords are easy to compromise as they are vulnerable to duplication or stealing.

Mobile communication systems control resources of a network that are utilised by mobile stations corresponding to authorised users. In a conventional Global System for Mobile communications (GSM), the mobile station (MS) includes a Subscriber Identity Module (SIM), which contains subscriber's information including data used to permit the MS to gain access to the network infrastructure of the GSM system. SIMs can be seen as security devices since they provide a unique means of identifying individual subscribers; they use cryptography and intrinsic computational capability to store secret information that is never divulged externally in a clear form.

In a conventional GSM network system, several databases are available for call control and for authentication and security purposes, which are typically: the home location register (HLR), the visitor location register (VLR), the authentication center (AUC), and the equipment identity register (EIR). For all users registered with a network operator, permanent data (such as the user's profile) as well as temporary data (such as the user's current location) are stored in the HLR. In case of a call to a user, the HLR is always first queried, to determine the user's current location. A VLR is responsible for a group of location areas and stores the data of those users who are currently in its area of responsibility. This includes parts of the permanent user data that have been transmitted from the HLR to the VLR for faster access. But the VLR may also assign and store local data such as a temporary identification. The AUC generates and stores security-related data such as keys used for authentication and encryption, whereas the EIR registers equipment data rather than subscriber data.

GSM distinguishes explicitly between user and equipment and deals with them separately. Several subscriber and equipment identifiers have been defined; they are needed for the management of subscriber mobility and for addressing of all the remaining network elements. The international mobile station equipment identity (IMEI), which is is a kind of serial number, uniquely identifies a mobile station (MS) internationally. The IMEI is allocated by the equipment manufacturer and registered by the network operator who stores it in the EIR. Each registered user, i.e., the subscriber, is uniquely identified by its international mobile subscriber identity (IMSI). The IMSI is typically stored in the SIM. A MS can only be operated if a SIM with a valid IMSI is inserted into equipment with a valid IMEI. The "real telephone number" of a mobile station is the mobile subscriber ISDN number (MSISDN). It is assigned to the subscriber (i.e., his or her SIM), such that a mobile station set can have several MSISDNs depending on the SIM.

General Packet Radio Service (GPRS) is a service designed for digital cellular networks (e.g., GSM or Personal Communication Service—PCS) and originally developed for GSM. The GPRS greatly improves and simplifies wireless access to packet data networks, e.g., to the Internet. It applies a packet radio principle to transfer user data packets in an efficient way between mobile stations and external packet data networks. Packets can be directly routed from/to the GPRS mobile stations to/from other GPRS terminals or to/from PDNs. Networks based on the Internet Protocol (IP) (e.g., the global Internet or private/corporate intranets) and X.25 networks are supported in the current version of GPRS.

GPRS optimises the use of network resources and radio resources and does not mandate changes to an installed Mobile Switching Centre (MSC) base of the GSM infrastructure. In order to integrate into the existing GSM architecture, the GPRS architecture generally comprises a Gateway GPRS Support Node (GGSN) and a Serving GPRS Support Node (SGSN). The GGSN, which is at the same hierarchical level as the MSC, acts as the gateway to other packet data networks such as the Internet. The SGSN is the serving node that enables virtual connections to the GPRS enabled mobile device and delivery of data. The SGSN sends data to and receives data from mobile stations, and maintains information about the location of a mobile station (MS). The SGSN communicates between the MS and the GGSN.

GPRS security functionality is typically equivalent to the existing GSM security. The SGSN performs authentication and cipher setting procedures based on the same algorithms, keys, and criteria as in existing GSM. GPRS uses a ciphering algorithm optimised for packet data transmission.

To exchange data packets with external PDNs after a successful GPRS attach, a MS must apply for one or more addresses used in the PDN, e.g., for an IP address in case the PDN is an IP network. This address is called PDP address (Packet Data Protocol address). For each session, a so-called PDP context is created, which describes the characteristics of the session. It contains the PDP type (e.g., IPv4), the PDP address assigned to the mobile station (e.g., 164.130.10.10), the requested Quality of Service (QoS), and the address of a GGSN that serves as the access point to the PDN. This context is stored in the MS, the SGSN, and the GGSN. With an active PDP context, the mobile station is "visible" for the external PDN and is able to send and receive data packets. The mapping between the two addresses, PDP and IMSI, enables the GGSN to transfer data packets between PDN and MS. A user may have several simultaneous PDP contexts active at a given time.

WO patent application No. 01/67716 describes a method for associating an MSISDN number of a mobile terminal with a temporarily assigned IP address for use in authentication, billing and personalization processes in a wireless application protocol (WAP) network.

WO patent application No. 01/03402 describes an authentication method for identifying a subscriber of a first network (i.e., the GPRS network) in a second network (e.g., an IP network), wherein an address of the second network is allocated to the subscriber. Information about a mapping between the address of the second network, e.g., the IP address, and a subscriber's identity is generated and transmitted to the second network. The subscriber's identity can be the IMSI and/or the MSISDN of the subscriber.

Applicant has noted that authenticating the access to an IP network by associating a subscriber's identity to the IP address is generally vulnerable to spoofing of IP packets, which allows an intruder on the Internet to effectively impersonate a local system's IP address. In addition, the two networks should be either directly connected (making the use of routable private IP addresses possible) or they need a compatible address plan.

WO patent application No. 01/17310 describes a system for authenticating a user requesting access to a PDN by applying GSM security principles. A remote host is connected to the PDN via an access network and an MS is coupled to a mobile network connected to the PDN. In response to receiving a user request to the PDN, the PDN generates and sends an authentication token to the user via the access network and the remote host, the user sends the authentication token back to the PDN over the mobile network, wherein the PDN compares the authentication tokens to determine whether to grant the user access to the PDN.

Applicant has observed that the disclosed authentication system is not transparent to the user, who has to wait for the authentication and has to send the received authentication token back to the PDN. Furthermore, since the remote server must know the telephone number of the user, the disclosed system can compromise the privacy of the user.

US patent application No. 2004/0132429 describes a method and system for providing access to an e-mail account via a mobile communication network, without special knowledge of mobile terminal programming or any POP3 or SMTP parameters. The mobile terminal is pre-configured with a default POP3/SMTP server address. For accessing an e-mail account a communication is built up between the mobile terminal client and a proxy server via the mobile network using standard POP3/SMTP. The user can be granted access to an e-mail account solely based on his MSISDN.

Universal Mobile Telecommunications Service (UMTS) can be seen as the direct evolution of GSM/GPRS networks. The security functions of UMTS are based on what was implemented in GSM, such as the authentication of subscriber, whereas some of the security functions have been added and some existing have been improved.

Packet switching utilizes data packets which are comparatively short blocks of message data. The packets may be of fixed length as in asynchronous transfer mode (ATM), or may be of variable length as in frame relay or the Internet protocol (IP). One desirable scenario is that packet-switched wireless network infrastructures support Internet telephony. Internet telephony, or IP telephony, refers to a class of applications that merge Internet capabilities with PSTN functions. IP telephony applications enable the transmission of real-time voice traffic over the Internet infrastructure and the seamless integration with the existing PSTN infrastructure. While IP telephony primarily focuses on voice calls, generally referred to as Voice over IP or VoIP, it can also be used to carry other voice-band or multimedia applications, such as fax, video and modem data.

A protocol that has been developed to support IP telephony is the Session Initiation Protocol (SIP). SIP is a signaling protocol for handling the setup, modification, and teardown of multimedia sessions, and in combination with the protocols with which it is used, describes the session characteristics of a communication session to potential session participants. These sessions include Internet multimedia conferences, Internet telephone calls and multimedia distribution. SIP invitations used to create sessions carry session descriptions which allow participants to agree on a set of compatible media types. SIP supports user mobility by proxying or redirecting requests to the user's current location. Usually, Real-Time Protocol (RTP) is used to exchange the multimedia (audio, voice or data) during the communication session, but SIP allows any transport protocol to be used. SIP uses a client-server model, where the client initiates SIP requests and the server responds to requests. In SIP, the endpoint entity is called User Agent, which is both a client (User Agent Client), i.e., the initiator of a SIP request, and a server (User Agent Server) that returns the responses.

SIP is deployed in the Internet that can be considered hostile environment, in which SIP elements and messages may be exposed to a variety of security threats and attacks. In a SIP-based system, authentication measures can be enabled at different layers, including application layer, transport layer and network layer.

H. Tschofenig et al. in "*Using SAML for SIP*", downloaded from Internet on Aug. 31, 2004, at http://www.ietf.org/internet-dratfs/draft-tschofenig-sip-saml-00._txt, proposes a method for using the Security Assertion Markup Language (SAML) in collaboration with SIP to accommodate an authorisation mechanism. An enhanced network asserted identity scenario is described, in which the enhancement is based on the attributes asserted by an Authentication Service (AS). A first user that wants to communicate with a second user sends a SIP INVITE to her preferred AS. Depending on the chosen SIP security mechanism, either digest authentication, S/MIME or Transport Layer Security is used to provide the AS with a strong assurance about the identity of the first user. After the first user is authenticated and authorized, a SAML assertion is attached to the SIP message.

As an increasing number of services begin to be offered over the Internet, the ability to provide an effective and secure single sign-on (SSO) mechanism for access to such services has become important. Services offered over the Internet are often distributed on a plurality of servers that are in remote locations with respect to each other. With a SSO mechanism, a user can authenticate his identity and authorisation to use a plurality of services distributed over the plurality of remote servers through an authentication procedure running on one or a small number of servers.

WO patent application No. 01/72009 discloses a SSO authentication mechanism, in which a token is transmitted to a user who has requested authorisation to access a service. The token may be valid only for a period of time. The authentication-related functionality is separated from the services and authentication needs not to be renegotiated for access to a new service from the plurality of services during a session. The user registers to for authorisation to access the service by communicating his credentials, e.g., username and password, before the token is transmitted.

The Liberty Alliance Project is an open standard organisation for federated identity and identity-based services. It provides a standard for a SSO that allows a user to sign-on once at a Liberty-enabled site and to be seamless signed-on when navigating to another Liberty-enabled site without the need to authenticate again. "Liberty ID-WSF—Web Services Framework" published at http://www.projectliberty.org/resources/whitepapers, offers an overview of the components of the Liberty ID-WSF. Message protection mechanisms can include token-based mechanisms, such as the propagation of a SAML assertion in a SOAP header block according to the Web Service Security (WS-Security) specification.

WO patent application No. 2004/064442 discloses a telecommunication method and system for providing SSO services for a user roaming in a packet radio network of a multinational mobile network operator that includes a federation of national network operators, one of these national network operators holding the user's subscription. This telecommunication system further comprises a number of service providers that have signed service agreements with the multinational mobile network operator federation for offering SSO services to users that are subscribers of any national network operator included in the federation. Each service provider comprises means for redirecting a user to a global SSO front end infrastructure as entry point in the federation; means for receiving a token from the user, the token being either an authentication assertion (a SAML assertion) or a reference thereof; means for retrieving an assertion from a site where the assertion was generated and means for checking that such site is trusted.

US patent application 2003/0163733 discloses a telecommunication system comprising means for redirecting a user accessing a service provider, the user having a subscription with a first mobile network operator, toward an Authentication Broker of a second mobile network operator having an agreement with said second mobile network operator: The first and the second mobile network operators belong to a federation and the Authentication Broker acts as entry point of the federation toward an Authentication Provider. Users present an unambiguous identity to their Authentication Provider for performing an SSO service request, e.g., MSISDN/IMSI.

SUMMARY OF INVENTION

The present invention relates to a method and system for authenticating a subscriber of a first network to access application services, which are accessible through a second network, which is a packet data network (PDN). Application services denote services defined at the application level, which can be represented in this context as the level (or levels) above the transport level. In particular, the application level can be represented (in a non limiting way) by the Layer 7 as defined in the Open System Interconnection (OSI) Model or by the Level 5 according to the TCP/IP model. Examples of application services are Web Services, which are generally consumed by a client application using protocols such as HTTP GET/POST, SMTP, or SOAP over HTTP, Web Sites, which are typically accessed through use of a browser, or VoIP.

Applicant has observed that a subscriber of a first network such as the GSM network is authenticated with a high-level security within that network.

Applicant has further observed that also in case the first network is a fixed-line access network the subscriber's identity can be validated with a high-level security within that network. In case the fixed access network uses a wired line shared with the public switched telephone network (PSTN), such as in case of xDSL technology, communication between the customer premises equipment (CPE) and the gateway to the PDN uses a secure and typically dedicated wired link, e.g. standard copper telephone wire or optical fibre.

Although wireless connections, such as Wi-Fi® connections, have been traditionally characterised by a relatively low-level security due to the wireless link to the PDN, solutions have been recently proposed, which guarantee a relatively high-level security of the network access. Examples of high-level security solutions are the IEEE 802.11i security standards, which are described for instance in "*IEEE 802.11i and wireless security*" by D. Halasz, downloaded from Internet on Sep. 20, 2005 at http://www.embedded.com/showArticle.jhtml?articleID=34400002.

Applicant has found that a subscriber identity defined in the first network can be used for authenticating the subscriber at the application level at which the application service through the PDN operates. In particular, according to the invention, the subscriber can be transparently authenticated to access an application service.

In a preferred embodiment of the invention, the first network of the subscriber requesting a service through a PDN is a packet-switched mobile network. More preferably, the packet-switched mobile network is the GPRS standard based on the GSM. The PDN is normally a network external to the mobile network, e.g., the IP network. The invention applies likewise to the case the application server hosting the application services is hosted in the same mobile network from where the subscriber starts the session, but the server is accessed through an external PDN. For example, the application server can be in a Value-Added Service (VAS) platform of a mobile operator, which is provided by an IP network. In particular, the PDN can be the private or public network of the service provider.

In another embodiment of the invention, the first network of the subscriber requesting a service through a PDN is a fixed access network wherein the subscriber accesses the PDN by using a customer premises equipment (CPE), such as a DSL modem linked to a PC or a residential gateway linked to a peripheral device, e.g., a telephone handset or a TV set-top box. The CPE is uplinked to the fixed access network by means of a relatively secure wired line or wireless link, such as a dedicated phone line, a dedicated optical fibre or a wireless connection with embedded the IEEE 802.11i security standard.

According to a preferred embodiment of the invention, the fixed access network is an xDSL access network.

Request to access an application service, hereafter referred also to as service, is in the form of an access-request message defined at the application level.

An aspect of the present invention relates to a method for authenticating a subscriber of a first network to access application services through a second network, wherein the second network is a packet data network (PDN) and the access to the application services is in the form of access-request messages enclosed in a data packet, said data packet including an address in said second network allocated to said subscriber (subscriber's address) and said access-request message expressed with a syntax that complies with an application-level protocol, the method comprising the steps of:
 a) intercepting an access-request message to the second network;
 b) recognising the application-level protocol;
 c) providing a mapping between the subscriber's address and a first subscriber's identifier in the first network;
 d) generating a first authentication token including a second subscriber's identifier;
 e) associating said first authentication token to the access-request message, and
 f) transmitting the access-request message with the associated first authentication token to the second network.

Another aspect of the invention relates to a system for authenticating a subscriber of a first network to access application services through a second network, wherein the second network is a packet data network (PDN), said system comprising
 a subscriber station coupled to the first network and apt to generate access-request messages enclosed in data packets, said access-request messages being expressed with a syntax that complies with an application-level protocol;
 an allocation server apt to allocate an address in said second network to said subscriber (subscriber's address) and to provide a mapping between the subscriber's address and a first subscriber's identifier in the first network;
 a gateway apt to perform the following functions: to receive the access-request messages from the subscriber station, to interface the first network to the second network and to assign the subscriber's address to the subscriber station;
 a first logical entity linked with the gateway and apt to intercept the data packets generated from the subscriber station and directed to the second network through the gateway and to capture in the data packet at least the subscriber's address, and
 a second logical entity linked with the first logical entity and apt to perform the following functions:
 to receive the subscriber's address and the access-request message from the first logical entity,
 to recognize the application-level protocol of the access-request message,
 to request the first subscriber's identifier to the allocation server, and
 to generate a first authentication token according to the application-level protocol, said token including a second subscriber's identifier,
 wherein the first logical entity or the second logical entity is apt to associate the authentication token to the access-request message.

BRIEF DESCRIPTION OF THE DRAWINGS

FIG. 2 reports an example of a table with the information stored in the Identity Authority (IA) according to an embodiment of the invention wherein the first network is a mobile network.

FIG. 8 reports an example of a table with the information stored in the Identity Authority (IA) according to an embodiment of the invention wherein the first network is a fixed network.

DETAILED DESCRIPTION

Figure 1:
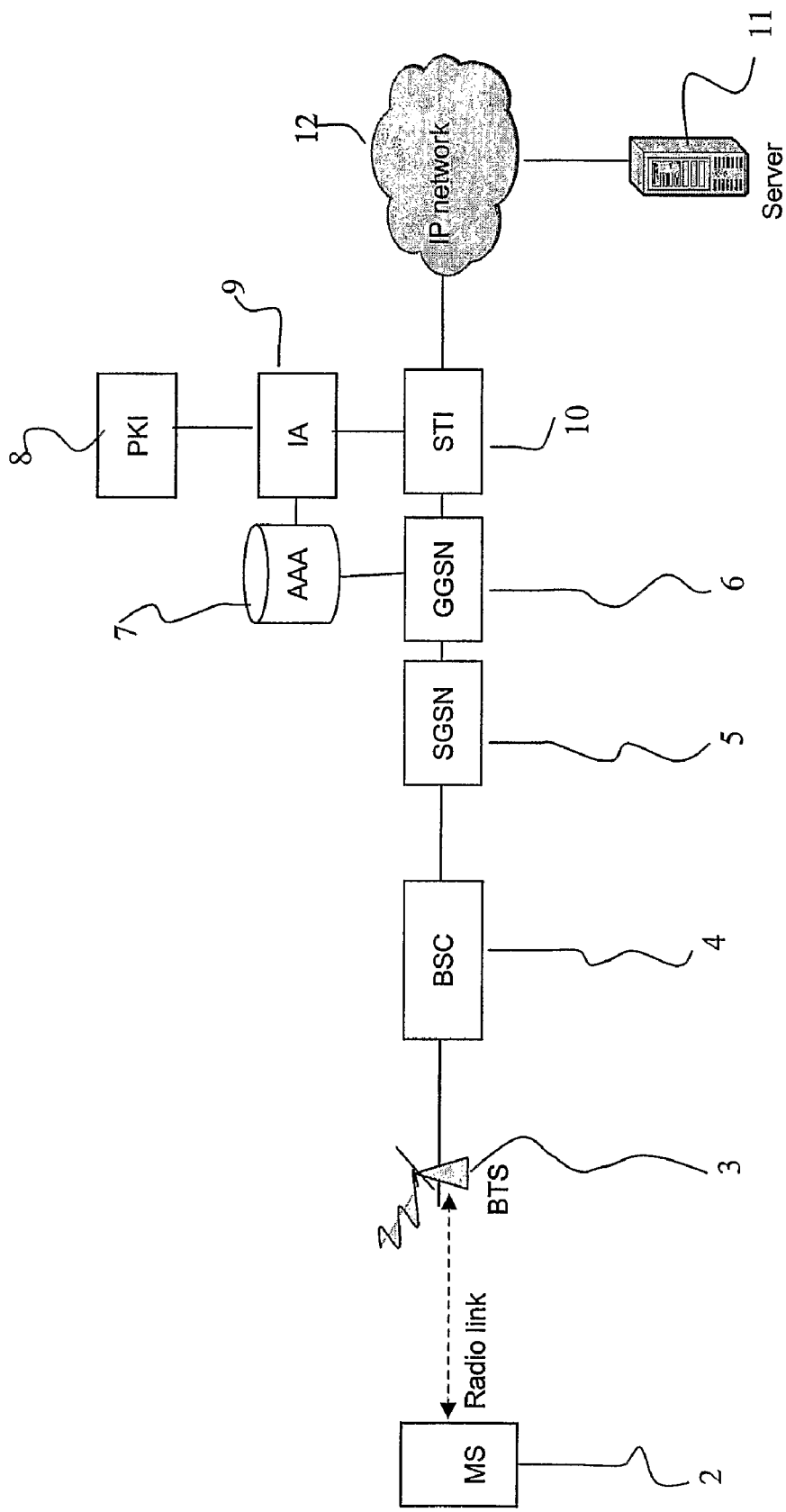
FIG. 1 shows an embodiment of the invention in which the first network of the subscriber requesting a service is a GPRS system, whereas the second network is an IP network.

FIG. 1 illustrates a preferred embodiment of the present invention. In the embodiment of FIG. 1, the first network is a GPRS system, whereas the second network is IP network 12. The embodiment of FIG. 1 can represent an exemplary scenario where a subscriber of the GPRS network wants to access from her/his mobile station (MS) 2, through the IP network, a service at a Web site hosted in an application server 11. An MS 2 is radio-connected to a Base Transceiver Station (BTS) 3, which connects to a Base Station Controller (BSC) 4. The combined functions of the BTS and BSC are generally referred to as the Base Station Subsystem (BSS). From there, the Service GPRS Support Node (SGSN) 5 provides access to the GGSN, which serves as the gateway to the data network, in this case the IP network 12. The SGSN 5 performs authentication and cipher setting procedures typically based on the same algorithms, keys, and criteria as in the existing GSM.

The MS 2, which can be a mobile phone, includes a Subscriber Identity Module (SIM), which carries identification and authenticating information by means of which the cellular network can identify the MS terminal within the cellular network and authorise it to function in the network.

In order to send and receive GPRS data, the MS 2 needs to activate a packet data address, i.e., in this embodiment an IP address, which will be used to access the service. When the subscriber requests a service, the MS 2 sends the request over the radio network which terminates on the GGSN 6. Using a specific protocol, the GGSN sends the request to the Authentication-Authorisation-Accounting (AAA) server 7, which is known per se. The AAA server can be for instance a Remote Authentication Dial-In User Service (RADIUS) server or a Dynamic Host Configuration Protocol (DHCP) server. In case the AAA server is a RADIUS server, the GGSN includes a RADIUS client so as to use the RADIUS protocol to communicate with the AAA server. According to the standard GPRS procedure, the AAA server can authenticate the subscriber based on any number of attributes, such as the Network Access Identifier (NAI) or the International Mobile Subscriber Identity (IMSI). The IMSI is an identification number that is univocally associated with a particular subscriber. The IMSI is generally assigned by the mobile network operator and it makes tracking of billing and service provisioning to a particular subscriber possible. The IMSI is generally carried in the SIM.

Alternatively, the Mobile Station International ISDN Number (MSISDN) can be used to identify the subscriber in the mobile network. However, since more MSISDNs, i.e., phone numbers, can be associated to the same IMSI, the IMSI is a preferred (but not limiting) subscriber's identifier.

The AAA server allocates an IP address to the MS and then returns it to the GGSN. The GGSN assigns the IP address to the MS. The protocol that is used for address assignment is specific to GPRS networks, and is commonly termed PDP Context Activation. The AAA contains a database wherein the allocated IP addresses are associated to a subscriber's identity, e.g., the IMSI.

It is to be understood that, although examples refer to an IP address allocated to the MS 2, more than one IP addresses can be allocated by the GGSN to the same MS. In that case, according to the GPRS specification, the GGSN can store the information on the active connections (PDP contexts) associated to the MS and can verify whether the IP address used by the MS in a data packet transmission is one of the IP addresses allocated by the GGSN to the MS.

It is to be noted that the SGSN 5, GGSN 6 and AAA 7 of the GPRS-GSM network are in the same domain, which is characterised by the GSM security scheme.

According to a preferred embodiment of the present invention, a logical entity (software module) 10, hereafter referred to as Security Token Injector (STI), is logically linked to the GGSN 6. The STI is positioned to control the incoming traffic from the GPRS/GSM network. In particular, the STI intercepts the data packets generated from the mobile stations and directed to the IP network 12 through the GGSN 6.

A data packet, e.g., an Internet packet, is a block of core data together with necessary address and administration information attached, to allow the network to deliver the data to the correct destination. The data packet starts out with the core data given by the application. The core data is enveloped with several layers of headers, wherein the layers can be described according to the OSI model. Within this (non limiting) description, each layer modifies the data packet as it passes through, a mechanism known as encapsulation. The core data contains an application-level message, which is expressed with a syntax that complies with an application-level protocol. Examples of application level protocols are FTP (File Transfer Protocol), HTTP (Hypertext Transfer Protocol), SOAP (Simple Object Access Protocol) or SIP.

An application-level message requesting the access to a service or to a service functionality or operation is referred in this context to as an access-request message. In this context, the access-request message does not necessarily describe a request to accede a service at the session initiation, but also the request to access a functionality or an operation provided by a service. An example of an access-request message in SIP is the INVITE message: when a User Agent client desires to initiate a session (for example, audio, video, or a game), it formulates an INVITE request. The INVITE request asks a server to establish a session (e.g., a voice call). In another example, when a Web page is requested, a "get" message is created with the information necessary to retrieve the desired data, e.g., the URL. The application-level protocol carrying the "get" message is for instance the HTTP. In this case, the "get" message includes a HTTP GET header and it is an example of an access-request message to a service (in this case the service of retrieving a Web page through Internet) at the application level.

The protocol stack on which the Internet runs can be described by the Internet protocol suite, which is also called the TCP/IP suite, after the two widely used protocols: the Transmission Control Protocol (TCP) and the Internet Protocol (IP). The set of protocols of the TCP/IP suite cover 5 layers of the OSI 7 layer model. Using the TCP/IP suite, the message is generally embedded in both the application header (which actually comprises in general several headers) and the application-level body (or payload). The headers are in a standardised format according to an application-level protocol, whereas the payload contains information that is up to the application and data does not conform to standard headers or format. Example of headers in HTTP are the type of message, such as the GET message, and the URL of the requested Web page. The next layer is the transport layer, which adds a layer of headers commonly defined in TCP or in User Datagram Protocol (UDP). At the network layer (in the Internet known also as the IP layer), the header (the IP header) contains the information needed to get the packet from the source to the destination including the source and destination addresses, i.e., the machine numbers.

The STI 10 operates at least at the network level and captures the data packets exiting the GGSN 6. If the STI operates only at the network level or up to the transport level only, it needs to capture all the data packets exiting the GGSN (and directed to the IP network), since it cannot recognise the application messages carried in the data packets, e.g., whether it is an access-request message and on which application-level protocol the message is carried. In case the STI operates also at the application level, it can recognise the access-request messages and discriminate the different application-level protocols. For instance, if operating also at the application level, the STI can be programmed to intercept only the SIP access-request messages and to let messages codified in other protocols through.

One of the technologies that can be used for the realisation of the STI module is that of an application-level firewall. Examples of commercial application-aware firewalls are Cisco PIX, Check Point Firewall-1® and Xtradyne's WS-DBC.

The minimum information that the STI has to intercept in a data packet carrying an access-request message is the information at the network level on the subscriber's address, e.g., in Internet the IP address allocated to the subscriber (i.e., to the MS). In general, the STI will need information on the destination address to transmit the data packet carrying the message at the end of authentication process as explained below more in detail. Preferably, this information is extracted by the STI when intercepting the data packet. This is however a non-limiting feature, as the STI could be configured to transmit the messages to destination address(es), which the authentication system has defined. It is to be noted that the destination address is not necessarily the address of the application server towards which the message is directed. For instance, according to the SIP protocol, messages can be directed to a SIP proxy that will then address the message to the application server as specified in an application-level address included in the message header.

At least part of the information contained in the data packets captured by the STI 10 is passed to a software component 9, referred to as Identity Authority (IA), which operates at the application level. The IA is responsible for the management of the identity of the subscribers accessing the external PDN, i.e., IP network 12. The IA receives from the STI at least the subscriber's IP address and the information on the application level protocol of the access-request message. The latter information can be obtained either by receiving the data packet from the STI (as a "closed envelope" if the STI operates only up to the network/transport level) or, if the STI operates also at the application level, by receiving specific information such as the protocol type (e.g., SOAP, HTTP, SIP). Other information received from an application-level operating STI can include the message type (e.g., INVITE or REGISTER) and the Universal Resource Identifier (URI) of the required services, for instance the URL of a Web page.

The IA 9 identifies the mobile station MS 2 (i.e., the subscriber) that requests a service by gaining knowledge of its IP address from the STI 10 and by gaining knowledge of the identity of the subscriber by interrogating the AAA 7, which contains the mapping between the allocated IP addresses and a subscriber's identity (or identities). As subscriber's identity, the IMSI is preferably extracted by the IA.

Preferably, the IA stores the information relative to the subscriber's identity and to the service he/she requests. The information on the requested service can be the IP address and/or the URI of the service provider and/or the protocol used by the service, in case the service provider offers more services using different protocols (e.g., POP3 for e-mail account and HTTP for Web navigation). In FIG. 2, an example of a table with the information stored in the IA is reported. The illustrated table provides a mapping for subscribers A, B and C, who want to access to one or more services characterised by the service provider SP-1, SP-2, etc. In the example of FIG. 2, the subscribers are identified by their IMSI. Preferably, a pseudonym PS is created by the IA for each subscriber, e.g., a PS corresponding to an IMSI of the subscriber is created. Alternatively, as reported in FIG. 2, more pseudonyms can be generated for a subscriber, where each pseudonym characterises a specific service requested by the subscriber. The creation of pseudonyms is preferred in order to avoid disclosing sensitive data, such as the IMSI, as it will become clearer in the following.

After having verified the subscriber's identity, e.g., by mapping the IP address with the IMSI associated with the subscriber, the IA generates a software token according to the application-level protocol of the access-request message. For example, in a case of a SOAP message for a Web Service, the token can be defined according to the WS-Security specification. The token is inserted in the access-request message, for example as a field inserted in an existing application header of the message or as a new application header added in the message.

Depending on which level the STI operates, either the token can be inserted in the message by the IA or the IA can order the STI to insert the token in the message. The latter option supposes that the STI operates also at the application level. In either case, the STI sends the modified access-request message, i.e., containing the token, to the application server 11, which receives an authenticated message.

Authentication of the message can be acknowledged by the application service (running in the application server 11) for instance by a particular application server software that verifies the token and then sends it to the application logics of the service. An example of framework controlling the authentication is the Sun Java System Access Manager, which is an architecture based on an open Java 2 platform.

The authentication token includes an identifier of the subscriber associated to a subscriber's identity defined in the mobile network, typically in the domain of the mobile operator, such as the IMSI or the MSISDN.

Preferably, the subscriber's identifier included in the token is a pseudonym associated to a SIM-based identity, e.g., the IMSI or the MSISDN. The use of a pseudonym protects the privacy of the subscriber and prevents the disclosure of sensible information, such as the IMSI, in order to avoid security threats (e.g., fraud to the billing process of the mobile operator), although the present invention does not exclude the use of a subscriber's identity defined in the mobile network in the authentication token. Alternatively, the identifier can be an authorisation string/code assigned by the mobile operator to a subscriber, in dependence for instance of his/her credit. Although it is preferred that the identifier corresponds univocally to a subscriber's identity, the same authorisation string/code can be assigned for a group of subscribers, for instance grouped by age.

Optionally, the IA passes the generated token, before transmitting it to the STI, to a Public Key Infrastructure (PKI) service 8, which certifies the token for instance by adding a digital signature to the token by means of asymmetric cryptography, which is known per se. The PKI 8 can be a commercial framework, like Entrust PKI or VeriSign®, or a freeware/open source tool like OpenSSL.

The authentication system of the present invention has the advantage that is transparent to the subscriber, who, after having requested a service, sees only the result of the authentication: either the access to the service or an access rejection.

The authentication software platform containing the STI and IA can be under the direct control of the mobile network operator.

Although shown as separate components external from the GGSN 6, the STI 10 and the IA 9 can be implemented within the GGSN, for example as software modules that are embedded in the GPRS standard control logic of the GGSN. This can improve the security of the STI against network-level attacks, since it would eliminate the physical connection between the GGSN and the STI.

Figure 3:
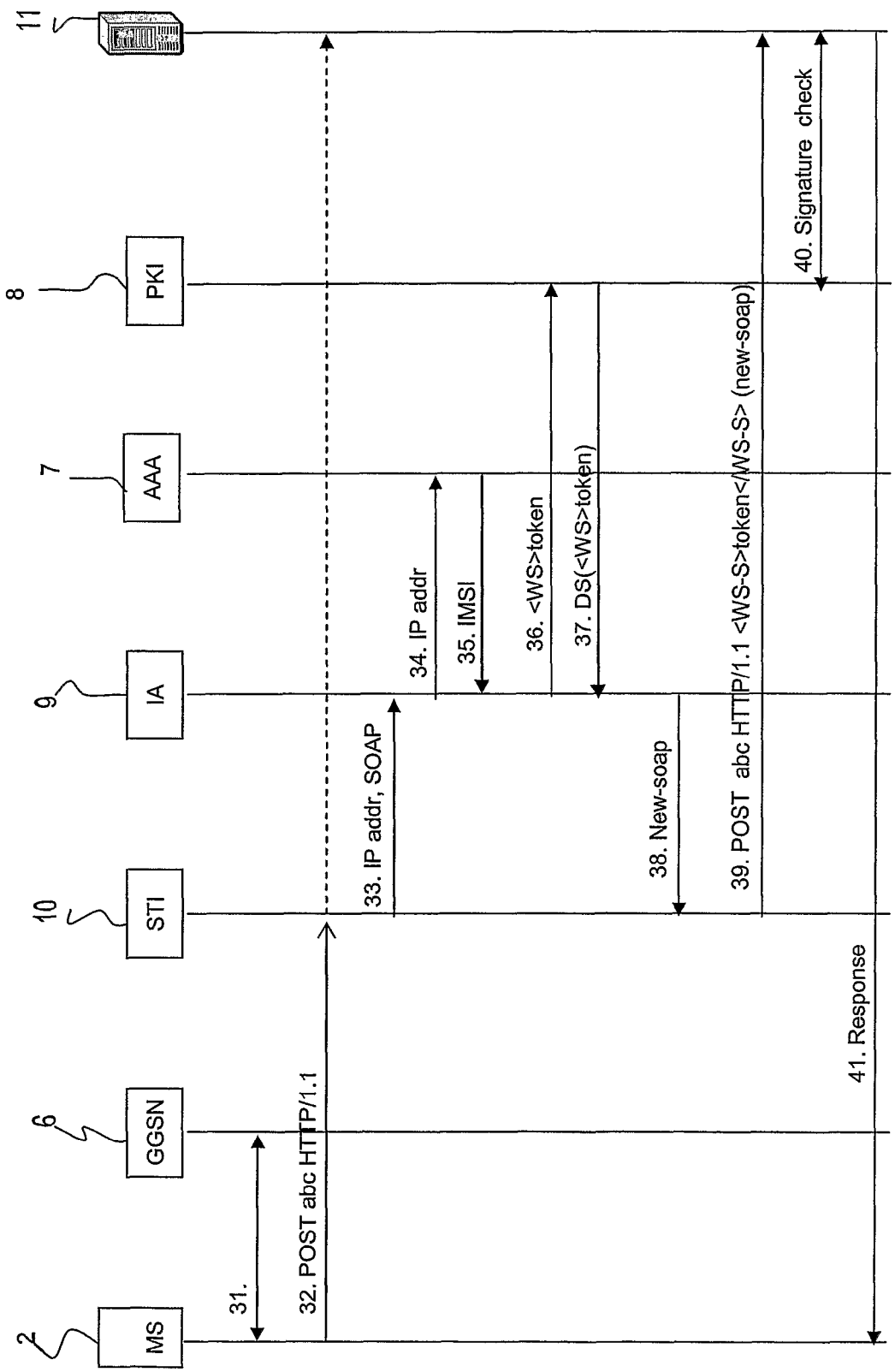
FIG. 3 illustrates the processing diagram of an access operation to a Web Service hosted in an application server, according to a preferred embodiment of the present invention.

The modules STI and IA can be software components realised in standard languages, such as Java, C, C++ and CORBA and installed on hardware components known per se FIG. 3 illustrates the processing diagram of an access operation to a Web. Service hosted in an application server, according to a preferred embodiment of the present invention. The main components interacting in the process flow represented in FIG. 3 have the same general logical functions as those described with reference to FIG. 1 and are indicated with the same reference number.

In the embodiment illustrated in FIG. 3, the MS 2 can be a cellular phone including a data-enabled client for the connection and data transfer within a packet-switched cellular network, such as GPRS, EDGE or UMTS. For instance, the cellular phone can be linked (with a wired or a wireless link) to a personal computer that utilises the phone for the connection to the packet-switched network. The application server 11 is hosted in a domain, which is external to the cellular network, which is connected to the server through a public IP network.

In FIG. 3, the MS requests the access to a service "abc" offered in the public IP network by using for instance the SOAP protocol, which is an XML-based language used to pass data to and from a Web Service. The SOAP message can be contained in a HTTP message (at the application level). A SOAP request could be for instance an HTTP POST or an HTTP GET request in the header, whereas the SOAP message is contained in the body, e.g. In FIG. 3, the example of an HTTP POST request id given, namely "POST /abc HTTP/ 1.1". Step 31 represents in a simplified manner the interaction between the MS 2 and the GGSN 6, necessary for the MS to gain access to the external network. During step 31, the MS is identified and authorised by the AAA 7, which allocates an IP address to the MS and stores in memory the mapping information between the IP address and a subscriber's identity, at least for the duration of the data session. In this embodiment, the subscriber's identity comprises the IMSI. After the authorisation and authentication phase within the cellular network of step 31, the access-request message carried in a data packet is forwarded by the GGSN to the external network (step 32). The dashed line of step 32 represents the logical path that the message would have travelled without the authentication mechanism according to the present invention, i.e., the message would have been transmitted to the application server 11, which would have then challenged the user by means of a challenge/response mechanism for authentication.

According to the present invention, at step 32 the data packet enclosing the access-request message is intercepted by the STI 10, which is located between the GGSN 6 and the public network. The STI extracts from the intercepted data packet the IP address of the subscriber, i.e., the address allocated to the MS for the session, and preferably the IP destination address, i.e., the address of the application server 11.

The STI then forwards the application message (in this case a SOAP message) and the subscriber's IP address to the IA 9 (step 33).

If the STI operates at levels lowers than the application level, the message is automatically forwarded to the IA, for instance by forwarding the application header(s) towards the IA. Conversely, if the STI operates at the application level, it recognises the protocol used in the application-level message, in this case the SOAP over HTTP protocol. In either case, the IA gains knowledge of the subscriber's IP address and of the application-level protocol which the message complies with. Transmittal of information between the STI and the IA can for instance occur by means of interfaces specified in Common Object Request Broker Architecture (CORBA), such as the Interface Definition Language (IDL), or in Web Services languages, such as Web Service Description Language (WSDL).

At step 34, the IA 9 interrogates the AAA 7 to determine an identity of the subscriber (connected to the cellular network by means of the MS 2) in the GSM network, said identity corresponding to the source IP address captured in the data packet. At step 35, the AAA 7 responds to the interrogation by providing the IA with a subscriber's identity, in this case represented by the IMSI, associated to the IP address.

At the next step (step 35), the IA generates a token including an identifier of the subscriber. The token, e.g., a string of characters, can be for instance defined according to the WS-Security specification (indicated in FIG. 3 as <WS>token). Preferably, the identifier included in the token is a pseudonym created by the IA and associated to the IMSI. The identifier can be also associated to the service provider as in the example illustrated in FIG. 2, such as in case more pseudonyms are created for the same subscriber, i.e., the same IMSI, to access different services within a session, as in the case of single-sign on (SSO) access mechanism. The IA keeps track of the mapping between the pseudonym(s) and the subscriber's identity defined in the cellular network (i.e., the IMSI), at least for the duration of the session.

The following example is a (simplified) SAML token expressed in XML format and complying with the OASIS (Organization for the Advancement of Structured Information standards) open standard:

```
<saml:Assertion   MajorVersion="1" MinorVersion="0"
    AssertionID="128.9.167.32.12345678"
    Issuer="Operator.com"
    <  IssueInstant="2004-12-03T10:02:00Z">   <saml:Conditions
        NotBefore="2004-12-03T10:00:00Z"
        NotAfter="2004-12-03T10:05:00Z"/>
    <saml:AuthenticationStatement
    AuthenticationMethod="<GSM>"
    AuthenticatiohInstant="2001-12-03T10:02:00Z">
    <saml:Subject>
    <saml:NameIdentifier
SecurityDomain="operator.com" Name="PSEUDONYM"/>
    </saml:Subject>
    </saml:AuthenticationStatement>
    </saml:Assertion>
```

The SAML token of the above example asserts the identity of the user whose name is "PSEUDONYM" (i.e., the identifier given by the IA), which is associated to an identity defined in the GSM network. Preferably, the SAML token contains the information on the authentication method used to authorise the access to the service, which is in this case defined by the GSM security scheme (indicated with <GSM>). Additional optional information is the issuer of the authentication (indicated with operator.com) and the conditions of validity of the token (indicated with the commands NotBefore and NotAfter).

Optionally, the token is forwarded to the PKI 8 service for affixing a digital signature to the token or for encrypting it according to known encryption mechanisms (step. 36). At step 37, the PKI returns the token either certified with a digital signature and/or secured by means of encryption. The certified/encrypted token is indicated in FIG. 3 with DS(<WS>-token).

Next to step 35 (or to step 37 if PKI service is included), the IA creates a new access-request message, indicated with "New-soap", which includes the generated token. Preferably, the new message is the access-request message transmitted from the MS in which the token has been added in the SOAP envelope as an additional field as described in the OASIS WS-Security specification. At step 38, the new access-request message (including the token) is passed to the STI for the transmission. The STI, which has previously copied and stored in its memory the data packet from which information has been extracted, then transmits the received access-request message to the application server 11 (step 39).

If a digital signature was affixed to the token, the application server verifies the digital signature by interrogating the PKI service (step 40). For instance, the PKI verifies that the certificate of the digital signature of the token is valid.

Finally, the application server 11, which has received the authentication of the subscriber's identity by means of the token, provides the authenticated subscriber the requested service (step 41).

It is to be noted that the authentication mechanism described in FIG. 3 is transparent to the user, who does not need to input credentials to access the service. In addition, the authentication mechanism allows a transparent access to a plurality of services with a SSO mechanism, which generally presupposes an agreement exists among service providers offering the services (identity federation).

Figure 4:
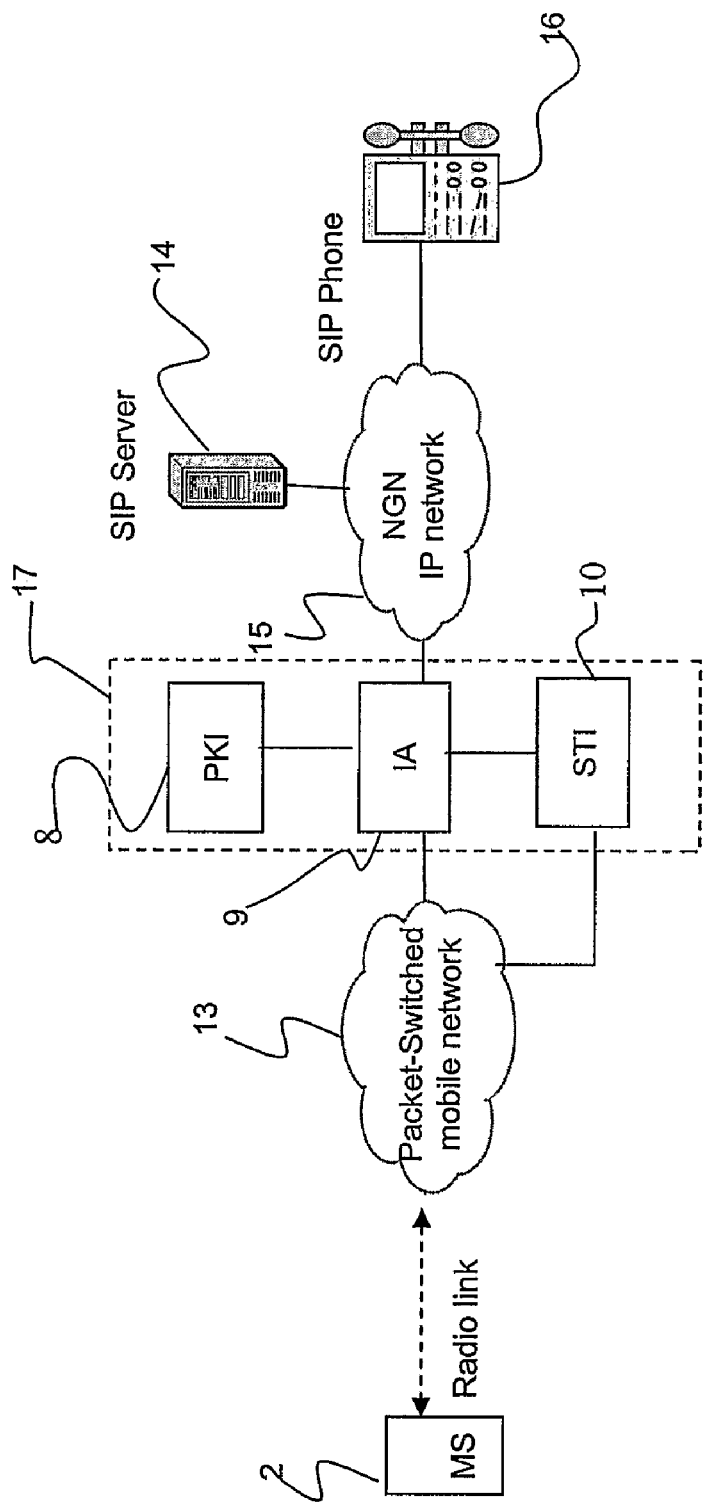
FIG. 4 illustrates a block diagram of a packet-switched network connected to an external NGN IP network, according to a further embodiment of the present invention.

FIG. 4 illustrates a block diagram of a packet-switched network connected to an external IP network, according to a further embodiment of the present invention. A MS 2 is radio linked to a packet-switched mobile network 13, e.g., a UMTS network. Although not shown in detail, the mobile network 13 includes an AAA server and a GGSN. The IP network is in this embodiment a Next Generation Network (NGN) 15, a packet-based network that allows convergence between the packet-based Internet and the telephony networks and supports all types of customer traffic including voice, data e video. An application of the NGN technology is the Voice over IP (VoIP). In this example, call/session functions in NGN network are based on Session Initiation Protocol (SIP). According to the embodiment illustrated in FIG. 4, a mobile phone MS 2 addresses a SIP message to a SIP server 14 through a NGN 15. The SIP messages exiting the GGSN of the mobile network 13 are intercepted by authentication platform 17. The authentication platform 17 includes a STI 10, an IA 9 and optionally a PKI 8, which have the same general logical functions as those described with reference to FIG. 1. After authentication, the SIP server 14 forwards the SIP message, always through the NGN 15, to a SIP phone 16, which is an IP node including a client application for making and receiving calls (i.e., a User Agent client and a User Agent server) to and from other phones, either IP-based or landlines/cell phones and which can be installed for instance in a personal computer. An example of SIP message is the request originating from a mobile phone 2 to set up a multimedia call (e.g., a videoconference) with SIP-phone 16.

Figure 5:
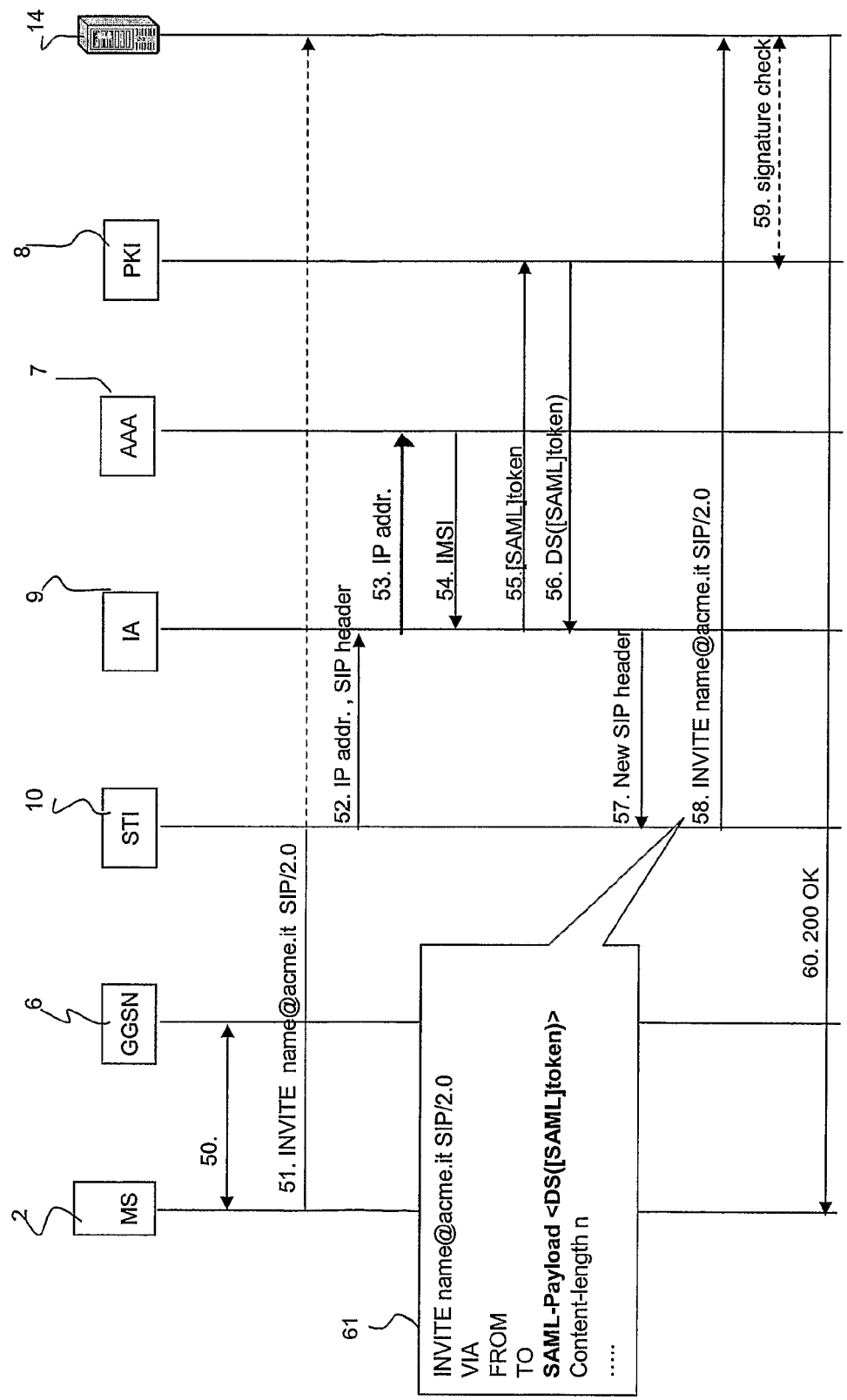
FIG. 5 schematically illustrates the processing diagram of an access operation through a NGN to a SIP service hosted in a SIP server according to another embodiment of the invention.

The processing diagram of an access operation through an NGN to a SIP service hosted in a SIP server is schematically illustrated in FIG. 5. The MS 2 requests access to a service offered in the NGN by using SIP protocol. For instance, the service is the set up of a videoconference session, which can be requested by an INVITE command. The SIP message can be for instance "INVITE sip:name@acme.com SIP/2.0", where name@acme.com is the Request_URI, which is a SIP URI (e.g., a URL) that specifies the destination of the SIP message. The Request_URI can be a user or a User Agent server defined in the SIP phone. In this example, the Request_URI is a user identified by the SIP-phone 16. The SIP message can be transported at the network level by either TCP or UDP.

Step 50 represents in a simplified manner the interaction between the MS 2 and the GGSN 6, necessary for the MS to gain access to the external network. During step 50, the MS is identified and authorised by the AAA 7, which allocates an IP address to the MS and stores in memory the mapping information between the IP address and a subscriber's identity, e.g., the IMSI, at least for the duration of the data session. After the authorisation and authentication phase within the mobile network of step 50, the access-request message carried in a data packet is forwarded by the GGSN to the external network (step 51). The dashed line of step 51 represents the logical path that the message would have travelled without the authentication mechanism according to the present invention, i.e., the message would have been transmitted to the SIP server 14.

According to the present invention, at step 52 the SIP message is intercepted by the STI 10, which is located between the GGSN and the NGN. The STI extracts from the intercepted data packet the source IP address (i.e., the address allocated to the MS) and destination IP address, i.e., the address of the SIP server that can handle the request and forward the INVITE message to the right callee (indicated by the SIP URI). The STI then forwards the SIP message and the subscriber's IP address to the IA 9 (step 52).

At step 53, the IA 9 interrogates the AAA 7 to determine a subscriber's identity corresponding to the source IP address captured in the data packet containing the SIP message. At step 54, the AAA 7 responds to the interrogation by providing the IA with a subscriber's identity, in this case represented by the IMSI, associated to the IP address.

At the next step (step 54), the IA generates a token including an identifier of the subscriber. The token can be for instance defined according to the SAML specification (indicated in FIG. 5 as [SAML]token). Preferably, the identifier is a pseudonym created by the IA and associated to the IMSI.

Optionally, the token is forwarded to the PKI 8 service for affixing a digital signature to the token and/or for encrypting it according to known encryption mechanisms (step 55). At step 56, the PKI returns the token either certified with a digital signature and/or secured by means of encryption. The certified/encrypted token is indicated in FIG. 5 with DS([SAML]-token).

Next to step 54 (or to step 56 if PKI service is included), the IA creates a new access-request message, indicated with "New SIP header", which includes the generated token. Preferably, the new message is the access-request message transmitted from the MS in which the token has been added in the SIP header as an additional field described in the SIP protocol, as illustrated in FIG. 5 by SIP header 61. The field "SAML-Payload" preceding the DS([SAML]token) is a keyword defined by the IETF and it is used to identify the SAML-token header.

The new access-request message (including the token) is passed to the STI for the transmission (step 57). The STI then directs the received SIP message 61 to the SIP server 14 (step 58).

If a digital signature was affixed to the token, the application server verifies the digital signature by interrogating the PKI service (step 59).

Finally, the application server 14, which has received the authentication of the subscriber's identity by means of the token, transmits a positive response to the INVITE message by sending a "200 OK" message to the MS (step 60), which is a standard SIP positive response to the INVITE. An audio-video stream using RTP can then be established between end-points.

Referring back to FIG. 4, although illustrated as external to the mobile network, the authentication platform 17 can be implemented in the mobile network 13, i.e., in the security domain of the mobile operator.

Figure 6:
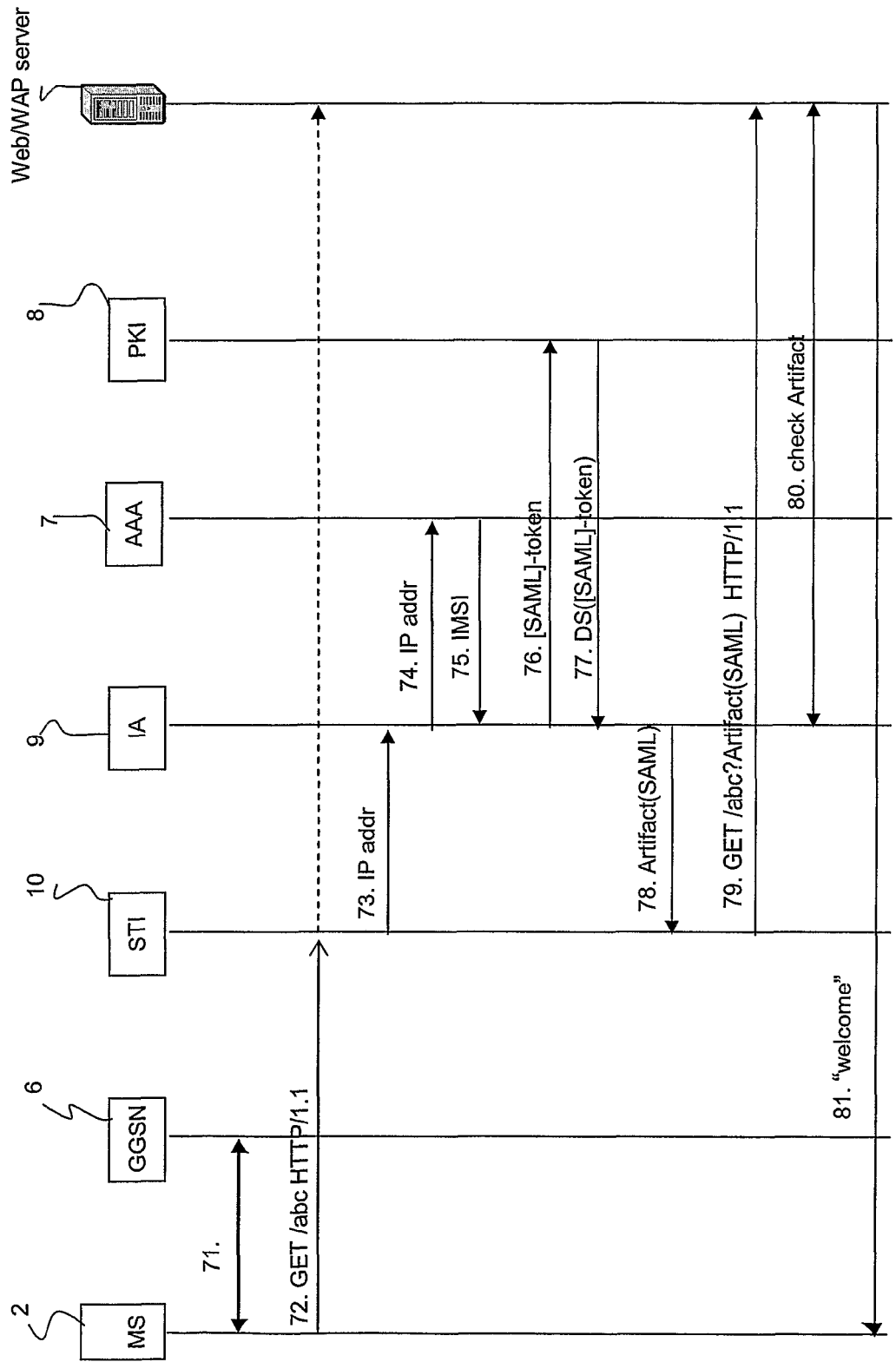
FIG. 6 shows the processing diagram of an access operation to a Web site hosted in an application server, according to an example of a preferred embodiment of the present invention.

FIG. 6 shows the processing diagram of an access operation to a Web site hosted in an application server, according to an example of a preferred embodiment of the present invention. The access to the Web site is from a circuit-switched mobile network, such as GSM, or from a GPRS, which are connected to the IP network by using Wireless Application Protocol (WAP). According to the present embodiment, the MS 2, e.g., a GSM telephone, encloses a microbrowser that interprets the WAP data. This WAP data is sent using a network protocol such as UDP. The application server can be a dedicated WAP server or a traditional Web server. The logical functions of gateway of the cellular network to the external networks is performed by a GGSN 6.

The embodiment illustrated in FIG. 6 can be for instance applied to the Identity Federation Framework (ID-FF) defined by the Liberty Alliance Project. The ID-FF is based on SAML standard and provides standard SOAP-based authentication and single-sign-on service interfaces to an identity provider.

In FIG. 6, the MS 2 requests the access to a service "abc" offered in the public IP network by using for instance the HTTP protocol. In FIG. 6, the example of an HTTP GET request is given, namely "GET /abc HTTP/1.1". Step 71 represents in a simplified manner the interaction between the MS 2 and the GGSN, necessary for the MS to gain access to the external network. During step 71, the MS is identified and authorised by the AAA 7, which allocates an IP address to the MS and stores in memory the mapping information between the IP address and a subscriber's identity, at least for the duration of the data session. In this embodiment, the subscriber's identity comprises the IMSI. After the authorisation and authentication phase within the cellular network of step 71, the access-request message carried in a data packet is forwarded by the GGSN to the external network (step 72). The dashed line of step 72 represents the logical path that the message would have travelled without the authentication mechanism according to the present invention, i.e., the message would have been transmitted to the Web/WAP server.

According to the present invention, at step 72 the data packet enclosing the access-request message is intercepted by the STI 10, which is located between the GGSN and the public network. The STI extracts from the intercepted data packet the IP address of the subscriber, i.e., the address allocated to the MS for the session, and the IP destination address, i.e., the address of the application server 11. The STI then forwards the application message (in this case an HTTP GET message) and the subscriber's IP address to the IA 9 (step 73).

At step 74, the IA 9 interrogates the AAA 7 to determine an identity of the subscriber (connected to the cellular network by means of the MS 2), said identity corresponding to the source IP address captured in the data packet. At step 75, the AAA 7 responds to the interrogation by providing the IA with a subscriber's identity, in this case represented by the IMSI, associated to the IP address.

At the next step (step 76), the IA generates a token including an identifier of the subscriber. Preferably, the identifier included in the token is a pseudonym created by the IA and associated to the IMSI. The token can be for instance defined according to the SAML specification (indicated in FIG. 6 as [SAML]-token). Preferably, the identifier is a pseudonym created by the IA and associated to the IMSI.

Optionally, the token is forwarded to the PKI 8 service for affixing a digital signature to the token and/or for encrypting it according to known encryption mechanisms (step 76). At step 77, the PKI returns the token either certified with a digital signature and/or secured by means of encryption. The certified/encrypted token is indicated in FIG. 6 with DS([SAML]-token).

Next to step 75 (or to step 77 if PKI service is included), the IA creates an "artifact" that acts as a pointer to the SAML assertion according to a standard defined by Liberty Alliance. Said artifact is indicated in FIG. 6 with "Artifact(SAML)". The artifact is then provided to the STI at step 78. At step 79, the STI sends the HTTP GET message containing the "Artifact(SAML)" to the Web/WAP server. During step 80, the server, which has received the access-request message containing the artifact, requests the IA to provide the SAML token corresponding to the artifact. After having received the SAML token including an identifier of the mobile subscriber making the request, the subscriber is identified (and authorised) and the server (i.e., the service provider) sends then a positive response "welcome" to the MS (step 81).

Figure 7:
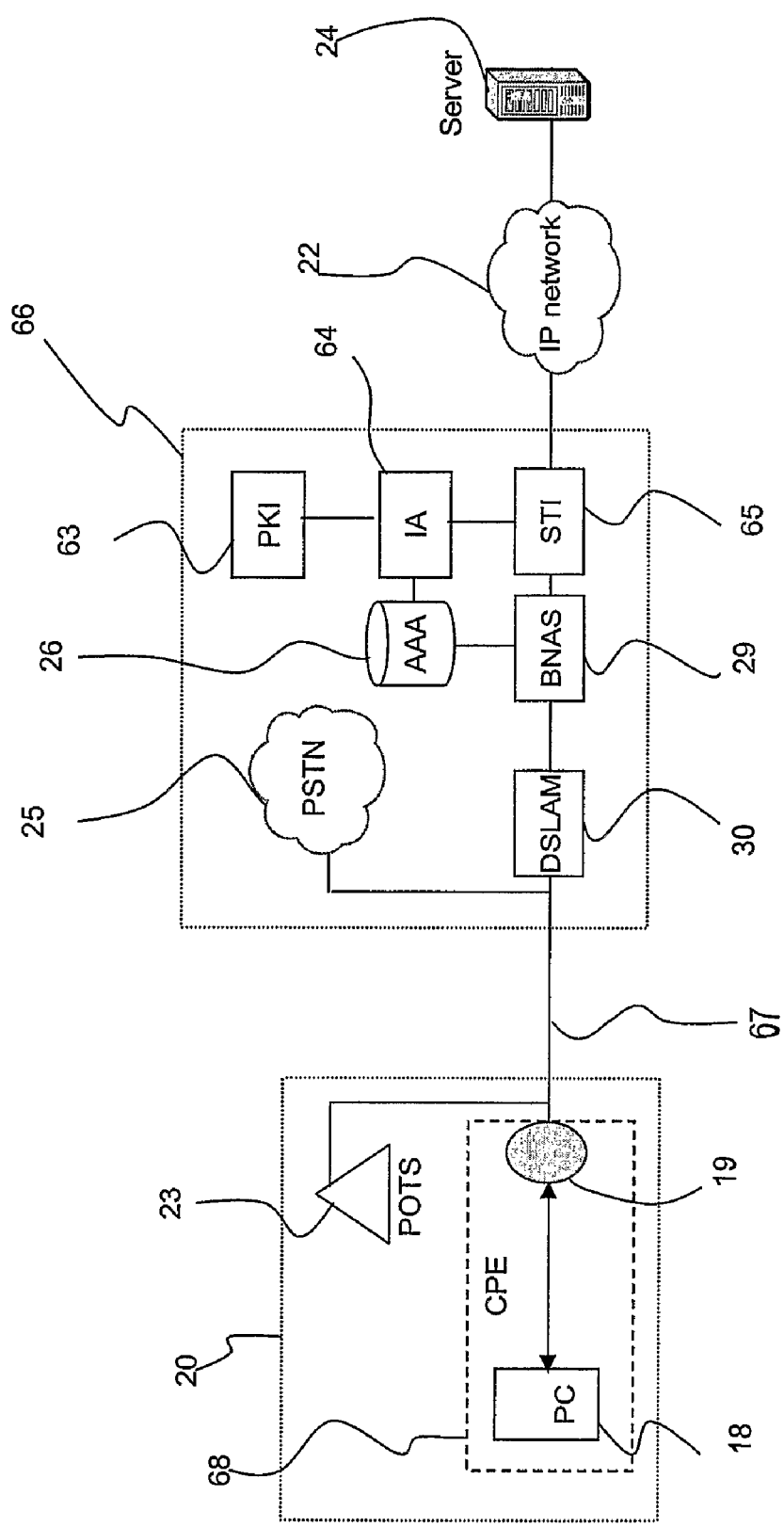
FIG. 7 shows an alternative embodiment of the invention in which the first network of the subscriber requesting a service is a fixed network (ADSL), whereas the second network is an IP network.

FIG. 7 illustrates another preferred embodiment of the invention in which the first network of the subscriber requesting a service is an ADSL access network, whereas the second network is an IP network. The embodiment of FIG. 7 can represent an exemplary scenario where a subscriber of the ADSL network wants to access from her/his personal computer (PC) 18, through the IP network, a service at a Web site hosted in an application server 24. In this example, the PC 18 is connected to an ADSL modem 19 through a standard serial USB (Universal Serial Bus) interface. The PC 18 and ADSL modem 19 is generally referred to as customer premises equipment (CPE) 68. However, alternative CPEs can be considered, such as a residential gateway connected to one or more PCs, IP phones or to a TV set-top box. Therefore, in general a CPE is employed to originate, route, or terminate telecommunications and to provide for authentication request to access a PDN, e.g., by typing a logon ID and password from a PC's keyboard or by automatic authentication from a residential gateway (e.g., by means of a string code included in a smart card or embedded in the firmware of the residential gateway). It is emphasised that this authentication is within the access network to authorise the access to a PDN (e.g., Internet).

The subscriber is connected via a CPE 68 with a DSL access multiplexer (DSLAM) 30. The DSLAM 30 includes a multiplexer/demultiplexer and the customer line (i.e., wired link 67) connects to an assigned ADSL terminal unit within the DSLAM at the central office (operator premises) 66. The DSLAM 30 uplinks to a broadband network access server (BNAS) 29, which provides the application-level session management including routing or service selection. The CPE resides at the end-user location (e.g., home or office), which is schematically indicated in FIG. 7 with reference number 20. The connection between the CPE and the DSLAM is a wired link 67, generally a standard copper telephone line. Conventional analog telephony, i.e., plain old telephone system (POTS) 23, can be optionally connected with a PSTN 25 via the same wired link 67. Therefore, the wired link 67 can carry both POTS and DSL signals. The BNAS 29, together with the DSLAM 30, functions as gateway to an external packet data network, in this case IP network 22. It is important to note that communication between the CPE and the DSLAM uses a dedicated wired link between the customer premises and the central office, thereby ensuring a high-level security of the communications within the DSL infrastructure.

The BNAS processes the authentication of the subscriber requesting to access the IP network so as to authorise the access to the subscriber. Logon authentication is carried out by an authentication, authorization and accounting (AAA) server 26. The AAA server 26 performs logical operations similar to those of the AAA server of the mobile network described in the embodiment of FIG. 1. In particular, the AAA server contains a database wherein the allocated IP address is associated to a, subscriber's identity within the xDSL network. According to known methods, authentication for accessing the PDN, which can be referred to as logon authentication, can be based on password-based mechanisms, smart cards or crypto tokens. A preferred logon authentication mechanism uses a logon ID, generally a username associated to a password, which is input by the subscriber when requesting a connection to an external data network. Logon ID can also be included in a smart card. The use of a logon ID allows discrimination between different users that may employ the same subscriber station, e.g., users that connect through the same PC. Alternatively, the subscriber can be identified within the ADSL infrastructure by the calling line identification (CLI) of the PSTN.

According to the invention, a Security Token Injector (STI) 65 is logically linked to the BNAS 29. The STI is positioned to control the incoming traffic from the ADSL network. In particular, the STI 65 intercepts the data packets generated from the CPE 68 and directed to the IP network 22 through the BNAS 29.

The STI 65 operates at least at the network level and captures the data packets exiting the BNAS 29. If the STI operates only at the network level or up to the transport level only, it needs to capture all the data packets exiting the BNAS (and directed to the IP network), since it cannot recognise the application messages carried in the data packets, e.g., whether it is an access-request message and on which application-level protocol the message is carried. In case the STI operates also at the application level, it can recognise the access-request messages and discriminate the different application-level protocols. For instance, if operating also at the application level, the STI can be programmed to intercept only the HTTP access-request messages and to let messages codified in other protocols through.

General logical functions of the STI 65 are analogous to those of the STI 10 described with reference to FIG. 1. In particular, the minimum information that the STI has to intercept in a data packet carrying an access-request message is the information at the network level on the subscriber's address, e.g., in Internet the IP address allocated to the subscriber.

At least part of the information contained in the data packets captured by the STI 65 is passed to software component Identity Authority (IA) 64, which operates at the application level. The IA is responsible for the management of the identity of the subscribers accessing the external PDN, i.e., IP network 22. The IA receives from the STI at least the subscriber's IP address and the information on the application level protocol of the access-request message. The latter information can be obtained either by receiving the data packet from the STI (as a "closed envelope" if the STI operates only up to the network/transport level) or, if the STI operates also at the application level, by receiving specific information such as the protocol type.

Logical functions of the IA 64 are substantially the same to those described with reference to FIG. 1. In particular, the IA identifies the subscriber (i.e., the subscriber's station e.g., via smart card logon or from the CLI) that requests a service by gaining knowledge of its IP address from the STI 65 and by gaining knowledge of the identity of the subscriber by interrogating the AAA 26, which contains the mapping between the allocated IP addresses and a subscriber's identity (or identities).

Preferably, the IA stores the information relative to the subscriber's identity and to the service he/she requests. The information on the requested service can be the IP address and/or the URI of the service provider and/or the protocol used by the service, in case the service provider offers more services using different protocols (e.g., POP3 for e-mail account and HTTP for Web navigation). In FIG. 8, an example of a table with the information stored in the IA 64 is reported. The illustrated table provides a mapping for subscribers A, B and C, who want to access to one or more services characterised by the service provider SP-1, SP-2, etc. In the example of FIG. 8, the subscribers are identified by their logon ID, e.g., username and password (LOGIN-A, LOGIN-B, etc.). Preferably, a pseudonym PS is created by the IA for each subscriber, e.g., a PS corresponding to a logon ID of the subscriber is created. Alternatively, as reported in FIG. 8, more pseudonyms can be generated for a subscriber, where each pseudonym characterises a specific service requested by the subscriber. The creation of pseudonyms is preferred in order to avoid disclosing sensitive data, such as the CLI or the logon ID.

After having verified the subscriber's identity, e.g., by mapping the IP address with the logon ID associated with the subscriber, the IA generates a software token according to the application-level protocol of the access-request message. The token is inserted in the access-request message, for example as a field inserted in an existing application header of the message or as a new application header added in the message.

Depending on which level the STI operates, either the token can be inserted in the message by the IA or the IA can order the STI to insert the token in the message. The latter option supposes that the STI operates also at the application level. In either case, the STI sends the modified access-request message, i.e., containing the token, to the application server 24, which receives an authenticated message.

The authentication token includes an identifier of the subscriber associated to a subscriber's identity defined in the fixed access network.

Preferably, the subscriber's identifier included in the token is a pseudonym associated to a subscriber's identity, e.g., the CLI or the logon ID. The use of a pseudonym protects the privacy of the subscriber and prevents the disclosure of sensible information, although the present invention does not exclude the use in the authentication token of a subscriber's identity defined in the PSTN or in the fixed access network. Alternatively, the identifier can be an authorisation string/code assigned by the PSTN operator to a subscriber, in dependence for instance of his/her credit. Although it is preferred that the identifier corresponds univocally to a subscriber's identity, the same authorisation string/code can be assigned for a group of subscribers, for instance grouped by age.

Optionally, the IA 64 passes the generated token, before transmitting it to the STI, to a Public Key Infrastructure (PKI)

service 63, which certifies the token for instance by adding a digital signature to the token by means of asymmetric cryptography, which is known per se.

Although shown as separate components external from the BNAS 29, the STI 65 and the IA 64 can be preferably implemented within the BNAS, for example as software modules that are embedded in the control logic of the BNAS. This can improve the security of the STI against network-level attacks, since it would eliminate the physical connection between the BNAS and the STI.

Although embodiments of the present invention are described with reference to FIGS. 7 to 9 in the context of digital subscriber line (DSL) technology (and in particular ADSL technology), it will be understood that the present invention is not limited to xDSL technologies. Indeed, other access technologies and/or network configurations, such as, but not limited to, hybrid fibre coax (HFC), wireless connections (e.g., WiFi® or WiMAX), fibre-to-the-home (FTTH), and/or Ethernet may also be used in other embodiments of the present invention.

Figure 9:
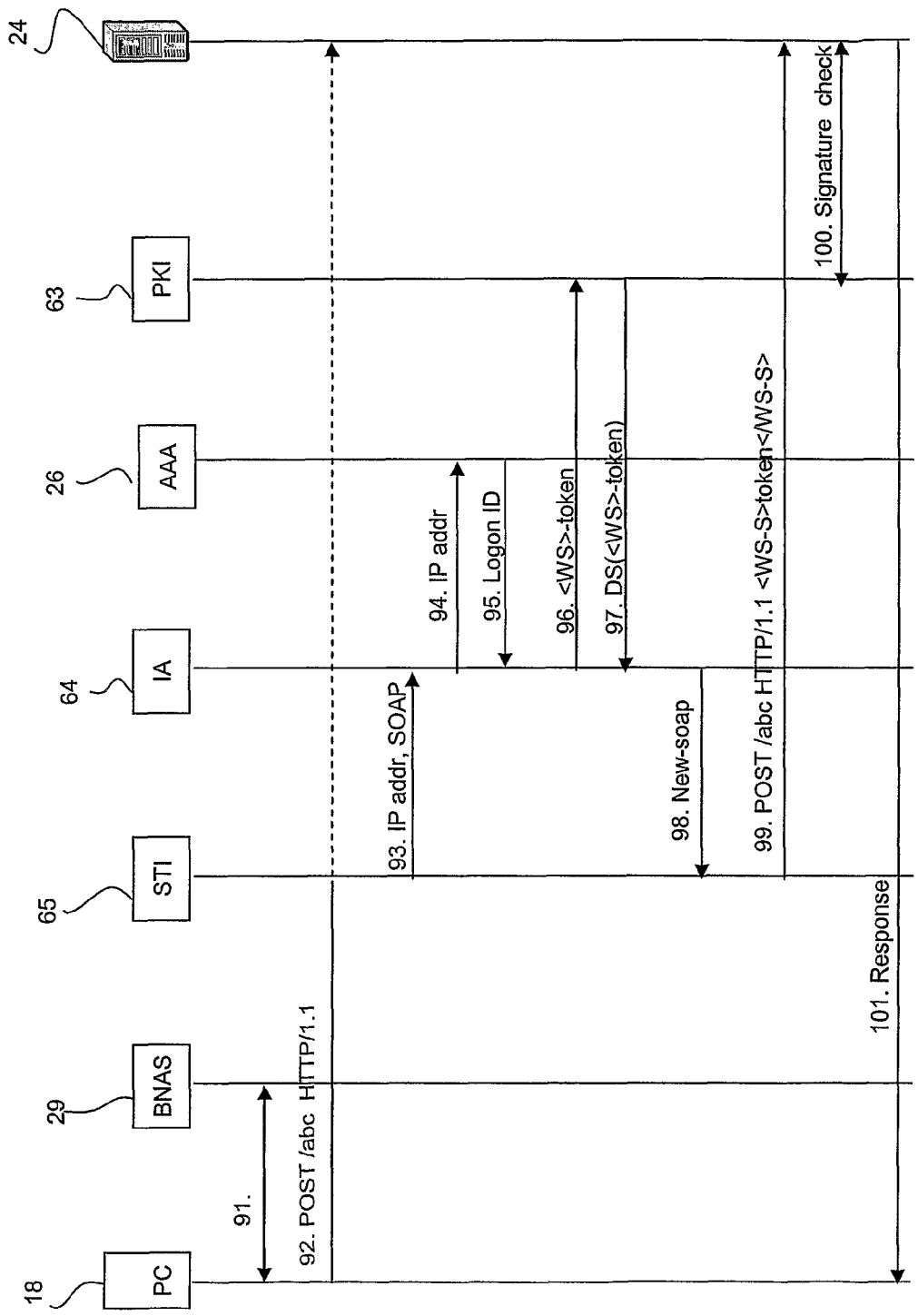
FIG. 9 illustrates the processing diagram of an access operation to a Web Service hosted in an application server, according to another preferred embodiment of the present invention.

FIG. 9 illustrates a processing diagram of an access operation to a Web site hosted in an application server. The main components interacting in the process flow have the same general logical functions as those described with reference to FIG. 7 and are indicated with the same reference number. In this embodiment, the subscriber station requests the access to a service "abc" offered in the public IP network by using the SOAP protocol. The HTTP request could be for instance an HTTP POST, e.g. "POST /abc HTTP/1.1". The subscriber station, which is in this embodiment an end-user peripheral device 18 (e.g., a PC) linked to an ADSL modem, authenticates within the ADSL infrastructure in a manner known per se at step 91. Namely, step 91 represents in a simplified manner the interaction between the PC 18 (via a DSL modem) and the BNAS 29, necessary for the subscriber station to gain access to the external network. Within the authentication phase, the AAA 26 allocates an IP address to the subscriber station and stores in memory the mapping information between the IP address and a subscriber's identity, at least for the duration of the data session. The subscriber station is then authorized from the ADSL access network to access IP services and an IP address is assigned to the subscriber.

After the authorisation and authentication phase within the access network of step 91, at step 92 the access-request message carried in a data packet is forwarded by the BNAS to the external network. The dashed line of step 92 represents the logical path that the message would have travelled without the authentication mechanism according to the present invention, i.e., the message would have been transmitted to the application server 24.

According to the present invention, at step 92 the data packet enclosing the access-request message is intercepted by the STI 65, which is located between the BNAS 29 and the public network. The STI extracts from the intercepted data packet the IP address of the subscriber, i.e., the address allocated to the subscriber station for the session, and preferably the IP destination address, i.e., the address of the application server 24. The STI then forwards the application message (in this case a SOAP message) and the subscriber's IP address to the IA 64 (step 93).

If the STI operates at levels lowers than the application level, the message is automatically forwarded to the IA, for instance by forwarding the application header(s) towards the IA. Conversely, if the STI operates at the application level, it recognises the protocol used in the application-level message, in this case the SOAP over HTTP protocol. In either case, the IA gains knowledge of the subscriber's IP address and of the application-level protocol which the message complies with. Transmittal of information between the STI and the IA can for instance occur by means of interfaces specified in Common Object Request Broker Architecture (CORBA), such as the Interface Definition Language (IDL), or in Web Services languages, such as Web Service Description Language (WSDL).

At step 94, the IA 64 interrogates the AAA 26 to determine an identity of the subscriber in the PSTN, said identity corresponding to the source IP address captured in the data packet. At step 95, the AAA 26 responds to the interrogation by providing the IA with a subscriber's identity, in this case represented by the Logon ID, associated to the IP address.

At the next step (step 96), the IA generates a token including an identifier of the subscriber. The token, e.g., a string of characters, can be for instance defined according to the WS-Security specification (indicated in FIG. 9 as <WS>token). Preferably, the identifier included in the token is a pseudonym created by the IA and associated to the logon ID. The identifier can be also associated to the service provider as in the example illustrated in FIG. 8, such as in case more pseudonyms are created for the same subscriber, i.e., the same logon ID, to access different services within a session, as in the case of single-sign on (SSO) access mechanism. The IA keeps track of the mapping between the pseudonym(s) and the subscriber's identity defined in the PSTN (e.g., the logon ID or CLI), at least for the duration of the session.

Optionally, the token is forwarded to the PKI 63 service for affixing a digital signature to the token or for encrypting it according to known encryption mechanisms (step 97). At step 98, the PKI returns the token either certified with a digital signature and/or secured by means of encryption. The certified/encrypted token is indicated in FIG. 9 with DS(<WS>-token).

Next to step 95 (or to step 97 if PKI service is included), the IA creates a new access-request message, indicated with "New-soap", which includes the generated token (step 98). At step 98, the new access-request message (including the token) is passed to the STI for the transmission. For instance, the new message is the access-request message transmitted from the subscriber station in which the token has been added in the SOAP envelope as an additional field as described in the OASIS WS-Security specification. The STI, which has previously copied and stored in its memory the data packet from which information has been extracted, then transmits the received access-request message to the application server 24 (step 99).

If a digital signature was affixed to the token, the application server verifies the digital signature by interrogating the PKI service (step 100). For instance, the PKI verifies that the certificate of the digital signature of the token is valid.

Finally, the application server 24, which has received the authentication of the subscriber's identity by means of the token, provides the authenticated subscriber the requested service (step 101).

It is to be noted that the authentication mechanism described in FIG. 9 is transparent to the user, who does not need to input credentials to access the service. In addition, the authentication mechanism allows a transparent access to a plurality of services with a SSO mechanism, which generally presupposes an agreement exists among service providers offering the services (identity federation).

Figure 10:
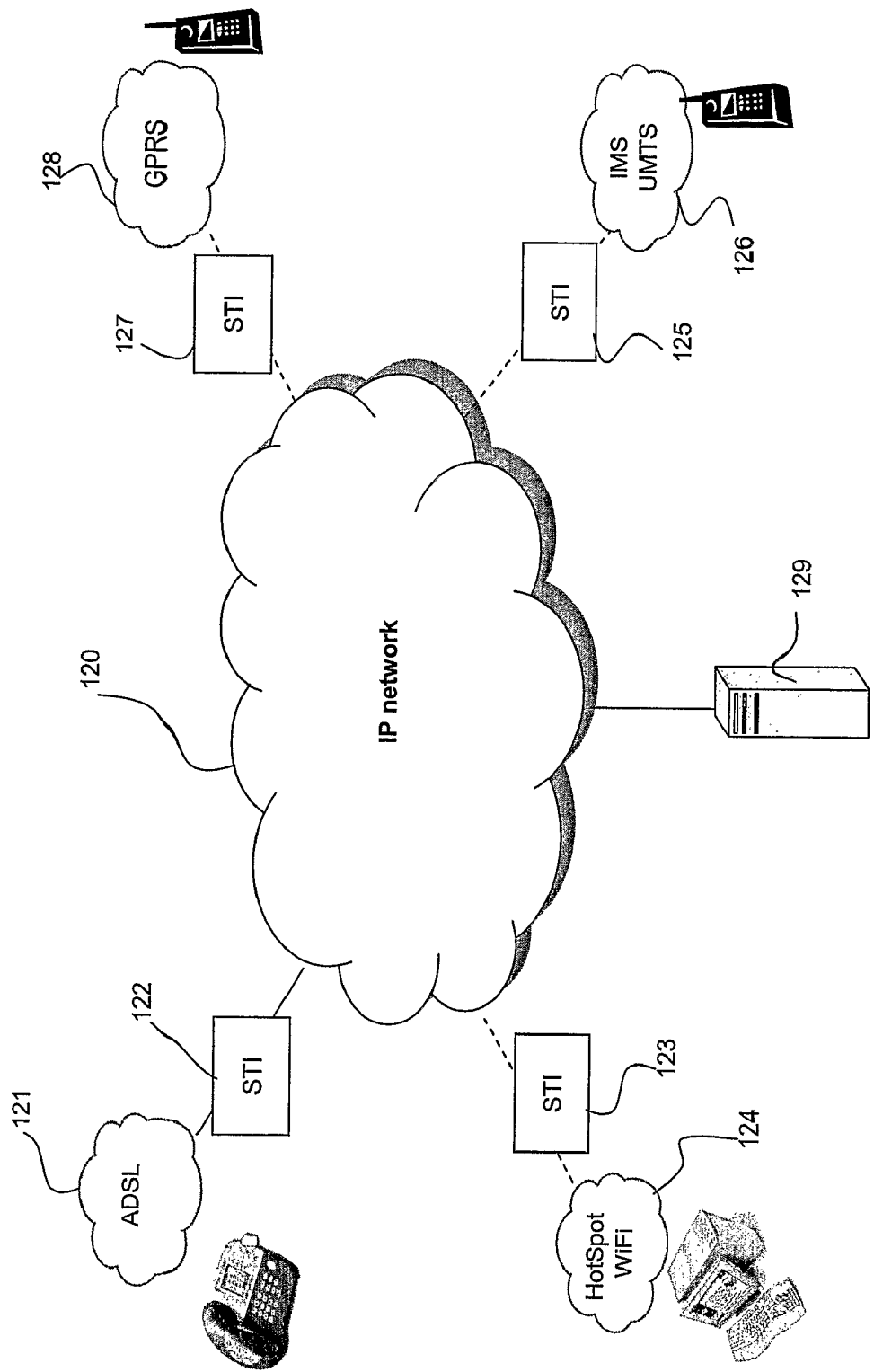
FIG. 10 shows an embodiment of the invention in which the user requesting a service is a subscriber of a plurality of (first) networks, whereas the second network is an IP network.

In recent years it has become more and more common that a user is a subscriber of more telecommunication networks and therefore wants or needs to access application services from different networks. As described with reference to FIGS. 2 and 8, different pseudonyms can be created for the same subscriber acceding different application services that can be (but not necessarily) delivered by different service providers. Applicant has noted that a user can be identified at a service application (i.e., to a service provider) by a pseudonym, which is the same for the different networks from which the user accesses the service. FIG. 10 schematically illustrates a scenario where a user is a subscriber of more than a telecommunication network, namely an ADSL access network 121, a wireless (WiFi®) access network 124, a GPRS/GSM network 128 and a UMTS network 126. The user can send a request to access an application service at the application server 129 through the IP network 120 from networks 121, 124, 126 or 128. An IP address is activated within the first network in which the request is generated and it is associated to an identifier by an AAA server (not shown), always within the first network. According to a preferred embodiment of the invention, a Security Token Injector (STI) is logically linked to the access gateway or access point (e.g., BNAS, GGSN), which acts as gateway to the IP network, of each first network from which the subscriber requests the application service. STI's 122, 123, 125 and 127 intercept access-request messages originating from networks 121, 124, 126 and 127, respectively. Although not shown in the figure, each STI is logically linked to an Identity Authority (IA) that is responsible for the management of the identity of the subscriber accessing the application service through the IP network. The functionality and logical operations of the STI and IA are described more in detail with reference to the previous embodiments. In particular, the IA of each first network gains knowledge of the identity of the subscriber from the captured IP address and associates a pseudonym to the IP address, which not only identifies the subscriber (by its association to a subscriber's identity within the first network), but relates to the application service requested. In order to be able to relate the requested service to the pseudonym, the IA (or the STI if it operates at the application level) needs to extract from the access-request message the URI of the requested service. By gaining knowledge of the URI, the subscriber's identifier can be associated to service-related pseudonym and then be inserted in the access-request message. The service-related pseudonym can be created by the service provider running the requested service, and then communicated to the IAs. Several solutions are possible to perform such communication. It could be performed either in an off-line way, through some provisioning tools provided by the IAs and used by the service provider, or at run-time, by means of protocols, such as the ones specified by the Liberty Alliance consortium for supporting identity federation.

It is to be noted that the also in this embodiment the identity of the subscriber is guaranteed by the first network from which the user requests the service.

A possible scenario of multi-network access can be that of a user that is a subscriber of a plurality of networks, e.g., a GPRS, a UMTS and a fixed access network such as xDSL over telephone lines of the PSTN, which are managed by a multi-platform operator.

Applicant has observed that some services require mutual authentication between the client (i.e., the subscriber station) and the server. In other words, when utilising some services through an external network such as the Internet, the user may need or want to know whether he or she is really communicating with the desired or correct server. If a remote computer is able to mimic the behaviour of the server, then the user may be spoofed or fooled into thinking that he or she is communication with the correct server. For instance, information about financial institutions, their customers and financial transactions has been traditionally considered very sensitive to security and trustworthiness. Nowadays, asymmetric key pair cryptography is often used e.g., in Internet banking to ensure security and confidentiality.

Figure 11:
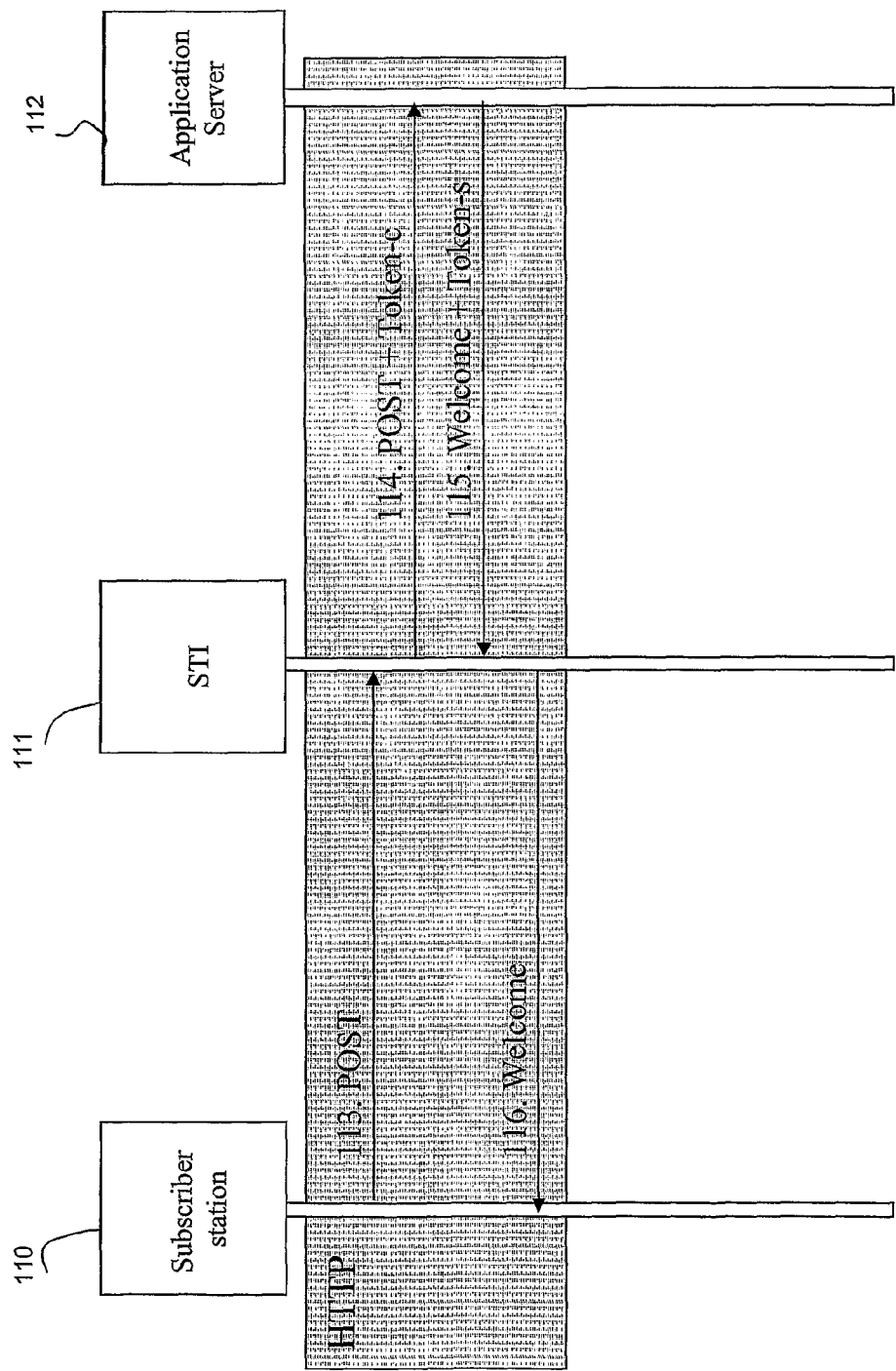
FIG. 11 schematically illustrates the processing diagram in a context of mutual authentication according to a further embodiment of the invention.

FIG. 11 is a simplified process diagram that illustrates an access to a service hosted in an application server through a PDN in a context of mutual authentication, according to a preferred embodiment of the invention. At step 113, the subscriber station 110, which can be either a mobile station or a CPE, requests a service hosted in application server 112. In this example, the message is an HTTP access-request message of the type POST. Always at step 113 and according to a method of the present invention (described more in detail in the previous embodiments), said message is intercepted by a STI 111 and a token, i.e., Token-c, is created and associated to the message. The STI then sends the message with the associated token to the application server (step 114). After having received the message (and optionally having verified the validity of the authentication), the server 112 creates a reply token, i.e., Token-s, which is put into the positive response "Welcome" to the received POST message. The Token-s can be a string of characters implemented in the software that runs the application service (e.g., Java Servlet or Microsoft Active Server Pages), for instance according to a standard such as a SAML assertion. Alternatively, the Token-s is generated by a logical entity (not shown in the figure) logically linked to the server, preferably at the service provider premises. The logical entity can be an application firewall located in front of the application server.

The response message including the Token-s and transmitted by the application server 112 to the subscriber station 110 is intercepted by the STI 111, which extracts the Token-s from the response message and verifies its validity. The validity can be verified by means of a digital signature or by a secret, e.g., a symmetric key, shared between the network operator (assuming that the STI is at the operator premises) and the service provider. If the validity of Token-s is positively verified, the STI transmits the intercepted positive response message "Welcome" to the subscriber station (step 116) or it creates a new positive response message that is transmitted to the subscriber station 110. Otherwise, the STI interrupts the communication and sends an error message to the subscriber station (not shown in the figure).

In the present embodiment it is assumed that the STI operates at the application level and therefore it can not only intercept the response message transmitted from the application server, but also extract the Token-s. It is to be understood that, in case the STI operates up to the transport level, the STI 111 intercepts the response message and then transmits it to the IA (not shown in FIG. 11), which extracts the application-level Token-s and verifies its validity.

Preferably, in order to avoid interception or theft of the Token-s by an unauthorised party, said token can be either protected by encryption or be associated to a lifetime.

It is worth noting that also the mechanism of authentication of the server has the advantage of being transparent to the end user.

The invention claimed is:

1. A method for authenticating a subscriber of a first network to access an application service through a second network, wherein the second network is a packet data network and the access to the application services is in the form of access-request messages enclosed in a data packet, said data packet comprising an address in said second network allocated to a subscriber's address and said access-request message expressed with a syntax that complies with an application-level protocol, comprising the steps of:

a) intercepting an access-request message to the second network;
b) recognising the application-level protocol;
c) providing a mapping between the subscriber's address and a first subscriber's identifier in the first network;
d) generating a first authentication token including a second subscriber's identifier;
e) associating the first authentication token to the access-request message; and
f) transmitting the access-request message with said first associated authentication token to the second network.

2. The method of claim 1, wherein the second network is an internet protocol network and the subscriber's address is the internet-protocol address.

3. The method of claim 1, wherein the first network is a mobile network.

4. The method of claim 3, wherein the mobile network is a packet-switched cellular network.

5. The method of claim 4, wherein the packet-switched cellular network is a general packet radio service network.

6. The method of claim 4, wherein the packet-switched cellular network is an enhanced data rate for global system for mobile communications evolution network or a universal mobile telecommunications service network.

7. The method of claim 4, wherein the first and the second subscriber's identifiers are different from one another.

8. The method of claim 7, wherein the first network is a global system for mobile communications network and the first subscriber's identifier is a subscriber identity module-based identity.

9. The method of claim 8, wherein the subscriber identity module-based identity is the international mobile subscriber identity associated with the subscriber in the global system for mobile communications network.

10. The method of claim 7, wherein the second subscriber's identifier is a pseudonym associated with the first subscriber's identifier.

11. The method of claim 1, wherein step e) comprises including the first authentication token in the access-request message.

12. The method of claim 1, further comprising after step d), the step of encrypting the first authentication token with a digital signature.

13. The method of claim 1, wherein said first authentication token is expressed with a syntax that complies with the application-level protocol of the access-request message.

14. The method of claim 1, wherein the application level protocol is selected from the group of session initiation protocol, hypertext transfer protocol, and simple object access protocol over hypertext transfer protocol.

15. The method of claim 1, wherein the application-level protocol is session initiation protocol or hypertext transfer protocol and said first authentication token is specified according to the security assertion markup language standard.

16. The method of claim 1, wherein the first network is a fixed access network.

17. The method of claim 16, wherein the fixed access network uses digital subscriber line access technology.

18. The method of claim 16, wherein the first subscriber's identifier is a logon ID.

19. The method of claim 1, further comprising after step f), the steps of:
g) receiving at the application service through said second network said access-request with said associated first authentication token;
h) generating a first response message to said received access-request message;
i) generating a second authentication token and including said second authentication token into said first response message;
j) intercepting said first response message including said second authentication token;
k) extracting said second authentication token from said first response message; and
l) verifying said second authentication token and, if the verification is positive, transmitting a second response message to the first network.

20. The method of claim 19, further comprising after step g), the step of verifying said first authentication token.

21. A method for authenticating a subscriber of a plurality of first networks to access an application service, wherein authentication of the subscriber from each first network is carried out by the method of claim 1.

22. The method of claim 1, further comprising the step of providing a mapping between the first authentication token and the requested application service.

23. The method of claim 22, wherein the mapping between the first authentication token and the requested application service comprises extracting the universal resource identifier of the requested service from the access-request message.

24. The method of claim 22, wherein the second subscriber's identifier is a pseudonym associated with the first subscriber's identifier and with the requested application service.

25. A system for authenticating a subscriber of a first network to access application services through a second network, wherein the second network is a packet data network, comprising:
   a subscriber station coupled to the first network and capable of generating access-request messages enclosed in data packets, said access-request messages being expressed with a syntax that complies with an application-level protocol;
   an allocation server capable of allocating an address in said second network to a subscriber's address and to provide a mapping between the subscriber's address and a first subscriber's identifier in the first network;
   a gateway capable of performing the following functions: to receive the access-request messages from the subscriber station, to interface the first network to the second network, and to assign the subscriber's address to the subscriber station;
   a first logical entity linked with the gateway and capable of intercepting the data packets generated from the subscriber station and directed to the second network through the gateway and to capture in the data packet at least the subscriber's address; and
   a second logical entity linked with the first logical entity and capable of performing the following functions:
      to receive the subscriber's address and the access-request message from the first logical entity,
      to recognize the application-level protocol of the access-request message,
      to request the first subscriber's identifier to the allocation server, and
      to generate a first authentication token according to the application-level protocol, said token including a second subscriber's identifier,
   wherein the first logical entity or the second logical entity is capable of associating said first authentication token with the access-request message.

26. The system of claim 25, wherein the allocation server and the gateway are in the first network.

27. The system of claim 25, wherein the first logical entity and the second logical entity are in the first network.

28. The system of claim 25, wherein the first network is a mobile network and the subscriber station is a mobile station coupled to the first network via a wireless link.

29. The system of claim 28, wherein the first network is a packet-switched cellular network.

30. The system of claim 28, wherein the gateway is a gateway general packet radio service network support note.

31. The system of claim 25, wherein the allocation server is an authentication-authorization-accounting server.

32. The system of claim 25, wherein the second network is an internet protocol network.

33. The system of claim 25, further comprising a certifying logical entity logically linked to the second logical entity and capable of encrypting the first authentication token.

34. The system of claim 25, wherein the first logical entity is an application-level firewall.

35. The system of claim 25, wherein the first network is a fixed access network and the subscriber station is a customer premises equipment coupled to the first network via a wired link.

36. The system of claim 35, wherein the first subscriber's identifier is a logon ID.

37. The system of claim 25, wherein said first logical entity is also capable of intercepting response messages transmitted through the second network and directed to said subscriber station through the gateway.

38. The system of claim 37, wherein said response messages include a second authentication token.

* * * * *